(12) United States Patent
Lee

(10) Patent No.: US 9,542,454 B2
(45) Date of Patent: Jan. 10, 2017

(54) OBJECT-BASED INFORMATION STORAGE, SEARCH AND MINING SYSTEM

(71) Applicant: Tsu-Chang Lee, Palo Alto, CA (US)

(72) Inventor: Tsu-Chang Lee, Palo Alto, CA (US)

(73) Assignees: Teresa Tai-Yi Lee, San Jose, CA (US); Jennifer Jen-Yi Lee, San Jose, CA (US)

( * ) Notice: Subject to any disclaimer, the term of this patent is extended or adjusted under 35 U.S.C. 154(b) by 186 days.

(21) Appl. No.: 13/779,420

(22) Filed: Feb. 27, 2013

(65) Prior Publication Data

US 2013/0170716 A1 Jul. 4, 2013

Related U.S. Application Data

(62) Division of application No. 11/314,031, filed on Dec. 20, 2005, now abandoned.

(51) Int. Cl.
*G06F 17/30* (2006.01)
(52) U.S. Cl.
CPC ..... *G06F 17/30539* (2013.01); *G06F 17/3002* (2013.01); *G06F 17/30256* (2013.01); *G06F 17/30867* (2013.01)
(58) Field of Classification Search
CPC ............... G06F 17/30017; G06F 17/30056
USPC .......................................... 707/913
See application file for complete search history.

(56) References Cited

U.S. PATENT DOCUMENTS

| | | | | |
|---|---|---|---|---|
| 6,347,313 B1 * | 2/2002 | Ma | ............... | G06F 17/30256 707/711 |
| 2003/0074360 A1 * | 4/2003 | Chen | ............... | G06F 8/60 707/707 |
| 2004/0218894 A1 * | 11/2004 | Harville | ............... | G06F 17/30241 386/241 |

* cited by examiner

*Primary Examiner* — Robert Beausoliel, Jr.
*Assistant Examiner* — Alexandria Bromell
(74) *Attorney, Agent, or Firm* — Thomas Schneck

(57) ABSTRACT

The patent application taught an object based information storage, search and mining system and method, which can store, retrieve, and mine massively amount of object data efficiently. A first embodiment includes an object based search engine which can organize and identify the objects efficiently from the search space based on certain operational measure quantifying the search objectives. A second embodiment includes an operational measure estimator which can adaptively adjust or reconfigure itself to improve the accuracy of the estimation. A third embodiment includes a method for mapping objects onto a topological maps to enable identifying objects rapidly from the search space according to certain measures for search objectives. A forth embodiment includes a method for conducting object based search through mapping query objects and search objects onto topological maps and searching effectively through the maps based on certain operational measures.

9 Claims, 26 Drawing Sheets

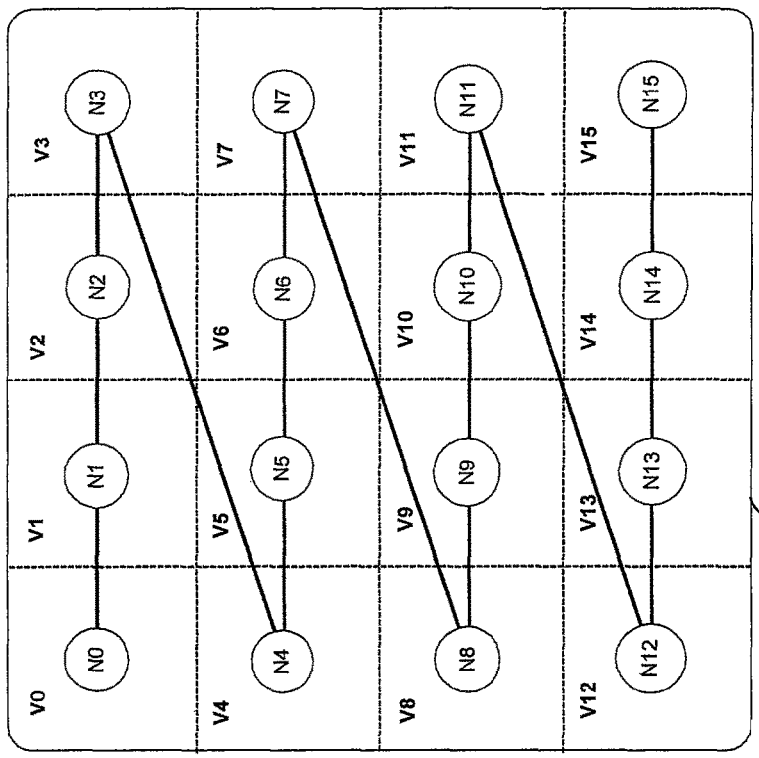
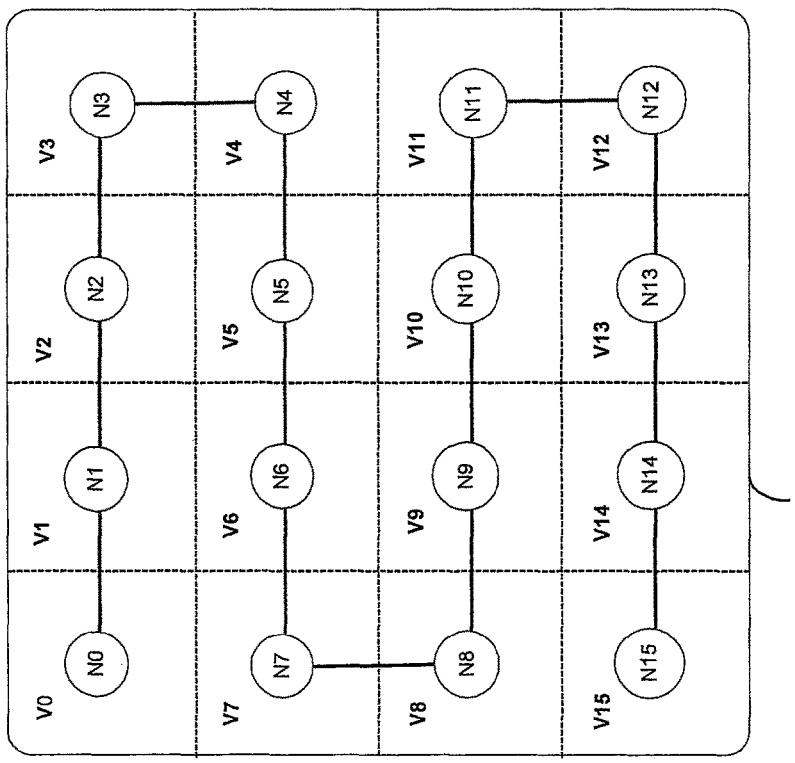
Fig. 14

OBJECT-BASED INFORMATION STORAGE, SEARCH AND MINING SYSTEM

CROSS-REFERENCE TO RELATED APPLICATIONS

This application is a divisional application of application Ser. No. 11/314,031, filed Dec. 20, 2005 which claims priority from provisional application ser. No. 60/638,929, filed Dec. 22, 2004; utility application Ser. No. 10/867,447 and Ser. No. 10/867,027 both filed Jun. 14, 2004 that each claim priority from provisional application ser. No. 60/480,985, filed Jun. 23, 2003.

BACKGROUND OF THE INVENTION

Field of the Invention

Generally, the present invention relates to multimedia data searching. More specifically, the present invention relates to data mining, internet search engines, multimedia storage, multimedia data bases, data warehousing, multimedia data compression, multimedia communications, data security and intelligence agents.

Description of Related Art

There are massive amount of multimedia objects on the Internet. Current Internet search engines are "text" or "hypertext" based. It is difficult to search for non-text media objects, like video, image, and audio, which are more targeted for human consumption. Most of the current methods for organizing multimedia data are based on "metadata", which is also text based information. There is no current effective method to arrange or sort media objects available in the disorder of the World Wide Web, or to construct an ordered media storage and media storage network structure based on the multimedia data content itself. Most, if not all, of the current search engines available today utilize fixed search criteria and cannot tailor or adjust to the requester's individual tastes or measures. The techniques and systems used in prior art systems are therefore optimized for, if not dedicated to, text-based searching, which limits their effectiveness for searching objects which are not text-based. However, the reduction of media objects to a set of metadata, as used by conventional systems, necessarily eliminates large amounts of the most useful data and therefore can often yield an unsatisfactory search result.

There has therefore been a need for systems, processors, techniques and methods for characterizing, searching for and sorting media objects available on the internet without the need to attach metadata to those media objects.

BRIEF SUMMARY OF THE INVENTION

The present invention provides a method to effectively represent, search, and manipulate multimedia objects through a group of interconnected multimedia search agents functioning logically on an interconnected multimedia storage network.

A first aspect of the invention is directed to a multimedia object mining agent (MOM), which can search for multimedia objects in a distributed multimedia data reservoir effectively to produce the results to satisfy certain content based multimedia queries.

A second aspect of the invention is directed to the search method and system of the multimedia object mining agent based on topological map structure to efficiently searching for the desired multimedia data from a large search space to satisfy users' multimedia information requirements. The search system also includes a dynamically adjustable cost function, which estimates certain operational measures; dynamically adjustable topological maps, which sort out the objects in the search space and query space; fast search method which exploits the neighborhood information in the topological maps, followed by detail and global search processes.

A third aspect of the invention is directed to a multimedia object store (MOS) and a multimedia object store network (MOSNET), which are interconnected multimedia storage devices with processing and communication capability. MOS and MOSNET are used to support the implementation and operation of multimedia object agents.

A fourth aspect of the invention is directed to a multimedia object mining network (MOMNET), which is a distributed agent network that can dynamically structure and organize itself to satisfy the users' multimedia information requests.

A fifth aspect of this invention is directed to applications, which include an n-dimensional image database, a data security and encryption system and a media contents push-pull agent.

A sixth aspect of this invention is directed to practical implementations for the structures and methods taught in this invention. The object oriented processing unit (OOPU) and object oriented memory unit (OOMU) are described to provide guidelines for implementing the data processing and storage structure for the multimedia object miner.

BRIEF DESCRIPTION OF THE DRAWINGS

These and other aspects of an embodiment of the present invention are better understood by reading the following detailed description of the preferred embodiment, taken in conjunction with the accompanying drawings, in which:

FIG. 14 shows an example illustrating neighborhood preserving mapping;

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
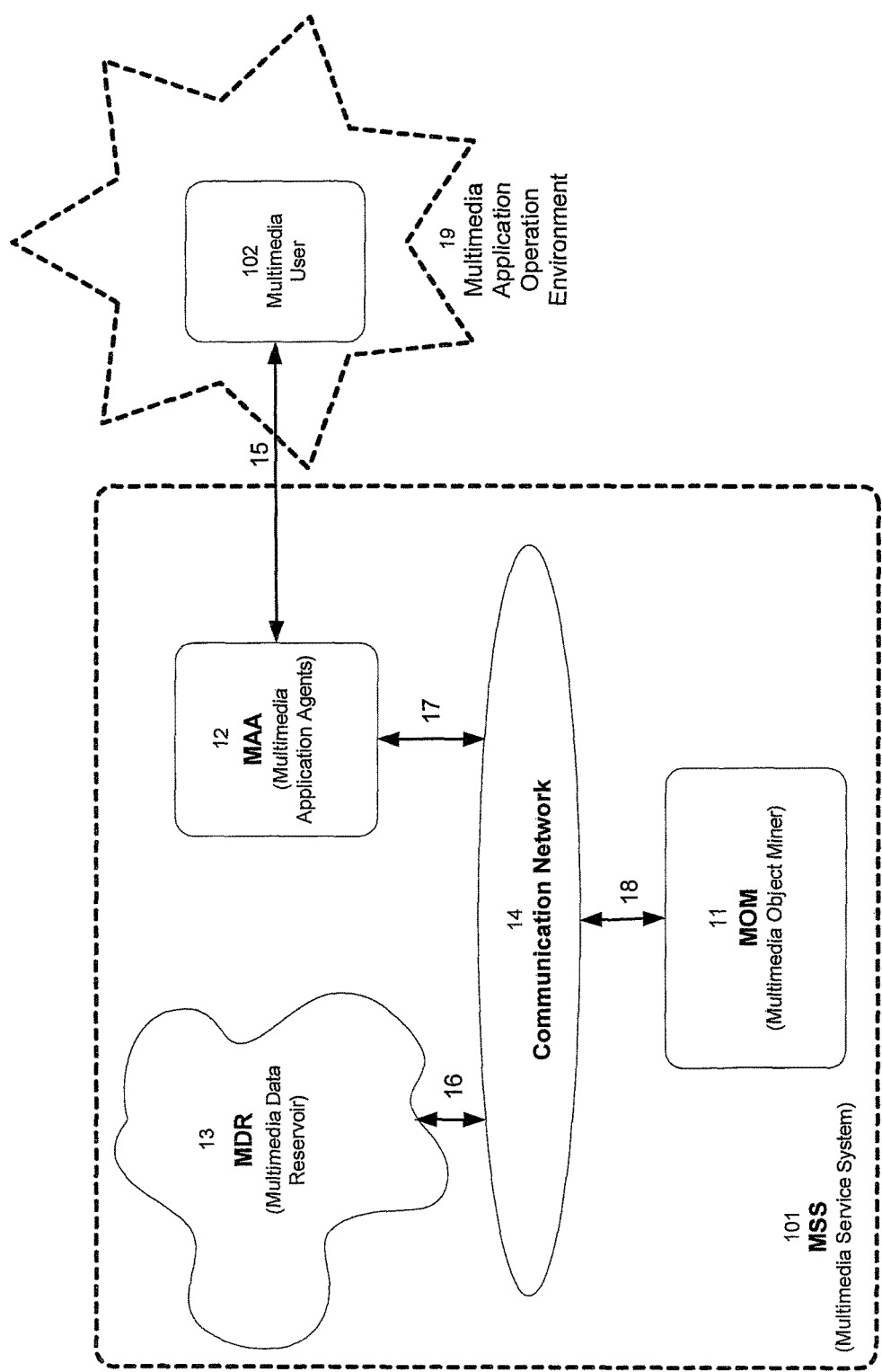
FIG. 1 shows a multimedia agent based service system.

Referring to FIG. 1, a generalized representation of an exemplary embodiment of the invention is shown. In this example, a multimedia service system ("MSS") 101 provides a plurality of services to a multimedia user 102 under a multimedia application operation environment 19. The MSS 101 comprises a multimedia object miner ("MOM") 11, a multimedia application agent ("MAA") 12, a multimedia data reservoir ("MDR") 13 and a communications network 14 connecting the MOM 11, MAA 12 and MDR 13. While the MSS 101 may be included in a single system, many embodiments of the invention provide a distributed architecture for deploying components of the MSS 101.

The MAA 12 typically delivers multimedia services to the user 102, in response to a multimedia service request. The MDR 13 is a depository of multimedia information that may be maintained on storage systems located locally or dispersed across one or more networks. The MOM 11 supports processes that search, process and provide multimedia objects in response to queries relayed by the MAA 12. The communication network 14 provides a plurality of communication channels for the exchange of information between the various components of the MSS 101 and between the MSS 101 and the user 102.

Multimedia Object Miner (MOM)

Figure 2:
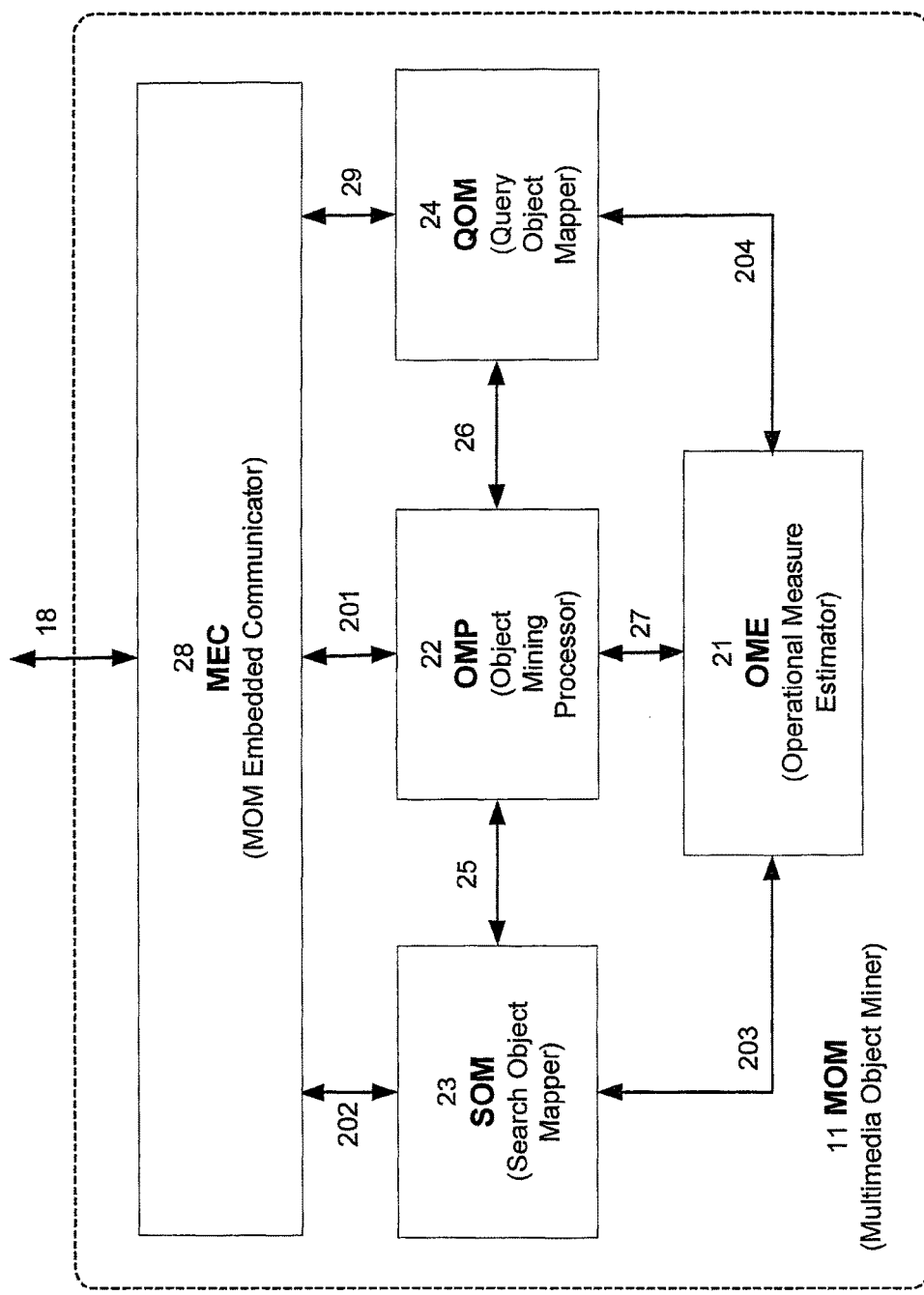
FIG. 2 shows the structure of a multimedia object miner (MOM)

Referring to FIGS. 1 and 2, FIG. 2 provides a block diagram representation of the MOM 11 as provided by embodiments of the invention. An object mining processor ("OMP") 22 initiates searches in the MDR 13 based on queries that are initially processed by a query object mapper ("QOM") 24. The QOM 24 typically sorts and organizes queries to create and update one or more topological query maps that may be used to optimize query processing. The query maps may maintain a history of queries and associated search result information that can be used to optimize subsequent searches. Results obtained by the OMP 22 may be presented to the MAA 12 or directly to the user 102.

The MOM 11 may also include a search object mapper ("SOM") 23 for sorting and organizing one or more search spaces of the MDR 13. The SOM 23 typically creates and updates one or more topological maps related to search objects, wherein the topological maps are used to optimize the search process. In at least some embodiments, an operational measure estimator ("OME") 21 provides an estimation of a search objective measure that may be used to assess expected outcomes of searches based on factors including merit of search points as discussed below. The OME 21 can provide estimations of certain search results based on information available during the search, the estimations relating to measures that can characterize the quality of the certain search results. The OME 21 may provide a search cost function value to estimate certain post search operational measures. This cost function value can be used to guide the search point evaluation for the OMP 22 and guide the adaptation of topological maps 23 and 24 (as described below). Typically, the MOM 11 also includes a MOM embedded communicator ("MEC") 28 for maintaining the communication channels that link MOM to other components and entities coupled to the communication network 14.

Figure 3:
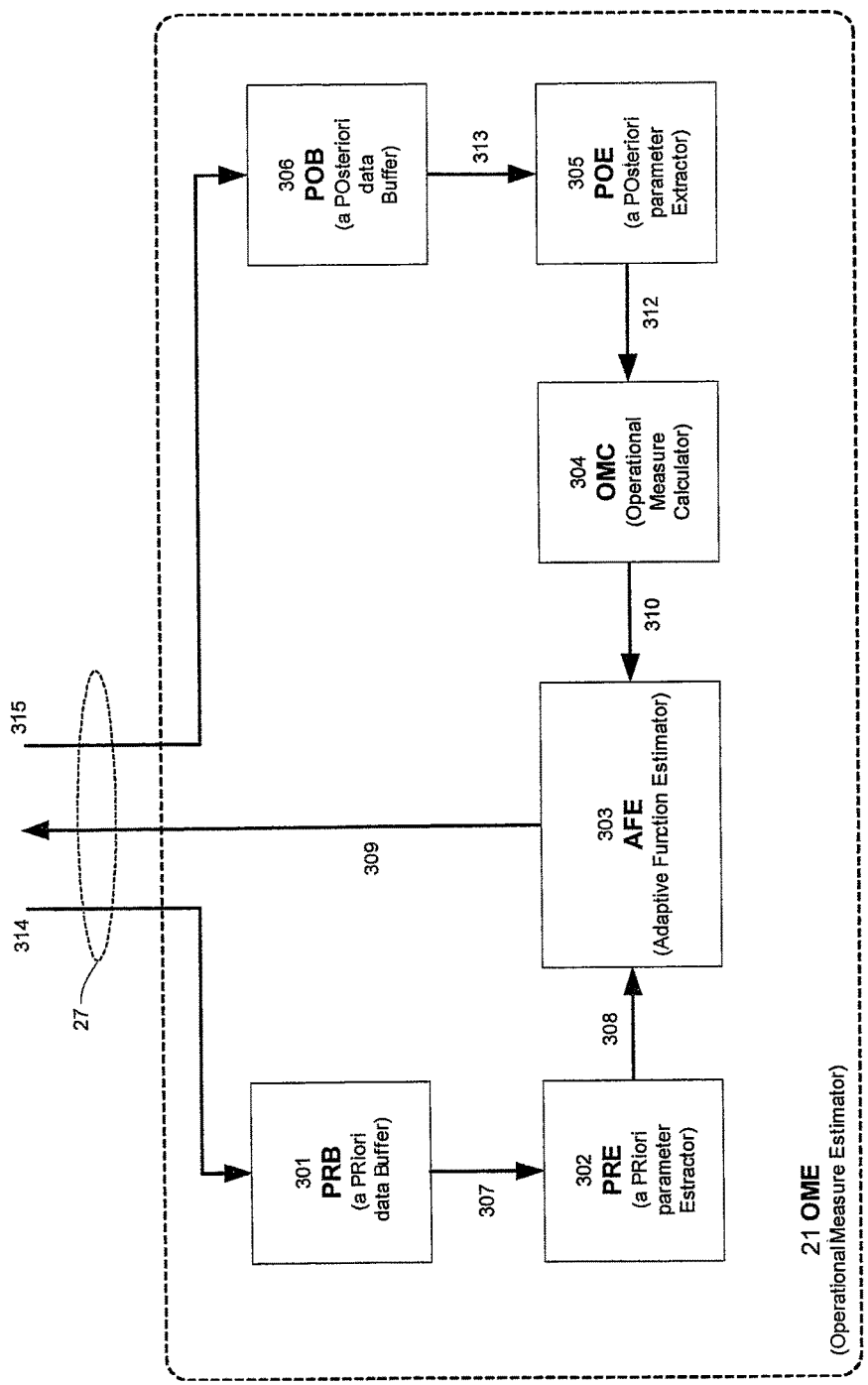
FIG. 3 shows an operational measure estimator (OME) used in the multimedia object minter (MOM)

Referring also to FIG. 3, the operation of the OME 21 and method for obtaining estimation 309 of a post-search operational measure value 310 may be understood. In many embodiments, the MOM 11 searches for a multimedia object wherein the multimedia object includes video information, picture, audio, hypertext and digital library data, N-dimensional image, multi-dimensional scientific signal samples, biological DNA sequence data, financial time series, marketing time series, production time series, logic or procedural data (like programs or scripts), and man-made data (such as design data used in art creation or engineering design). The multimedia objects may have a hierarchical form and may comprise a plurality of data types. A successful search of multimedia objects may provide a desired result if a target is adequately characterized and sufficient search criteria are selected. The OME 21 provides the estimation 309 of the operational measure value 310 which measures the merit of the search result. The operational measure value 310 is calculated based on the merit of the actual operational outcome using the certain search results. The purpose of the search is usually to identify objects to be used in certain operations following the search process. During the search process, since the operation is not performed and the results of the operation is now known yet, hence the measure about how well the objects can be used in the target operation can only be estimated by the estimated operational measure. However, after the objects are identified from the search process and the post search operations done, the merit of the results from the operations can be actually evaluated based on certain operational measures. The post search actual operational measure can then be used to adjust or reconfigure the operational measure estimator for the searches afterwards to reduce the estimation error.

The estimation 309 is typically obtained by first obtaining the a priori data and stored in an a priori data buffer (PRB) 301. The a priori data buffer (PRB) stores relevant "pre-operation" data (i.e., the data available before the target actions or operations are taken to the search results) that may be available during the search process. Then, the a priori input parameters 308 are extracted using an a priori parameter extractor (PRE) 302. Last, an adaptive function estimator (AFE) 303 receives the a priori parameters 308 and provides estimation 309 of the operational measure.

Parameters associated with the search results (hereinafter "a posteriori input parameters") 312 are typically processed in a similar manner to the a priori input parameters 308. The search results comprise data, hereinafter called a posteriori data that is derived by processing an object retrieved by the search. An a posteriori data buffer (POB) 306 is provided to store information derived from processing the retrieved object. An a posteriori parameter extractor (POE) 305 extracts the a posteriori input parameters 312. An operational measure calculator (OMC) 304 calculates the operational measure value 310 from the a posteriori input parameters 312. It will be appreciated that this a posteriori operation measure 310 can be fed back into the AFE 303 to adjust the internal structure or parameters of the AFE 303 such that the AFE 303 may provide better estimation. Thus the operation of the AFE 303 may be characterized as adaptive in nature since performance of the AFE 303 can be improved and optimized after each search. This "adaptation" can be performed through a "supervised learning" process to dynamically and iteratively improve estimation accuracy.

It will be appreciated that quality of results delivered by the MOM 11 is dependent, at least in part, on selection of appropriate operational measures. Appropriate operational measures include information measure and entropy measure, as defined in the well-known Shannon's information theory. Many embodiments of the present invention employ entropy as an operational measure for the result of the search.

The operational entropy of an object ("O") related to encoding method ("m") is represented as I_m(O), and may be calculated as a number of bits required in encoding the object. A relative operational entropy may be defined, at least for the purpose of this application, as the number of bits required to encode a first object ("O1"), given information related to the encoding of a second object ("O2"), using encoding method m; the relative operation entropy may be represented as Ir_m(O1, O2). It will be appreciated that I_m( ) and Ir_m( ) define upper bounds of Shannon's theoretic measure. It can also be appreciated that such entropy-based measurement differs from what can be referred to as "energy-based measurement" used in most prior art search processes.

The present invention provides an entropy based operational measure that can generate search results with a perceptual quality that is better suited to human searchers because it will be appreciated that the human perception system has evolved to process "information" and entropy-based measurements are information-oriented. In many embodiments of the invention, the AFE 303 is instrumental in providing accurate guidance in driving the search process. In at least some embodiments, the AFE 303 implements a parameterized function with adaptable parameters to provide a result $R_{AFE}$ 309 such that:

$$R_{AFE}=F(X1,X2,\ldots,Xn|K1,K2,\ldots,Km), \quad [E1]$$

where {X1, X2, . . . , Xn} are a priori input parameters extracted by the PRE 302 and {K1, K2, . . . , Km} are controlling parameters which are adaptable through a supervised learning algorithm to minimize the estimation error. A very simple form of parameterized function is a linear model such as:

$$F = \sum_i Ki * Xi \quad [E2]$$

Figure 13:
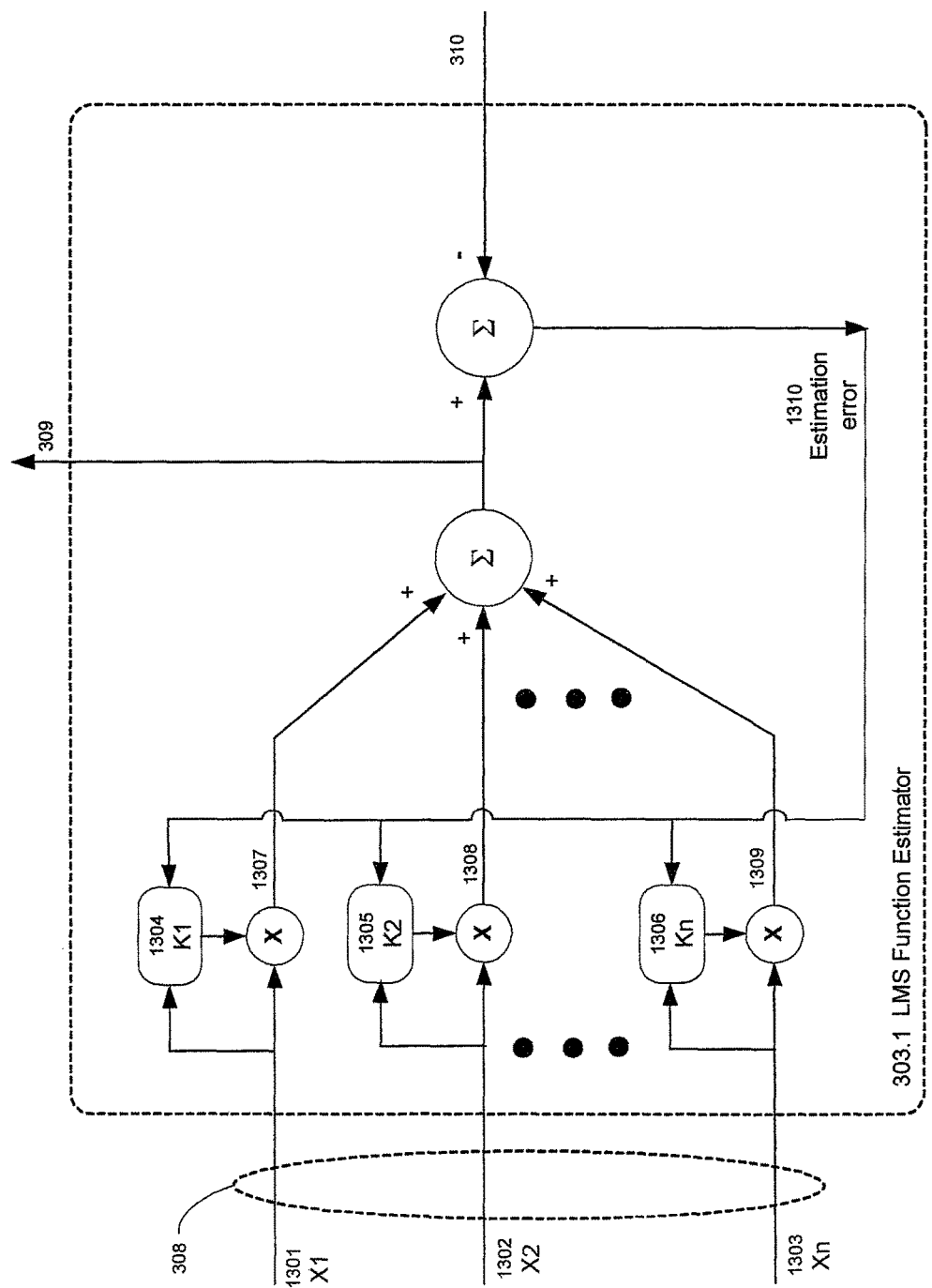
FIG. 13 shows the structure of a Least Mean Square (LMS) estimator.

Referring to FIG. 13 an example of the structure of a typical Least Mean Square ("LMS") function estimator 303.1 as implemented by an AFE 303 is shown. A set of a priori input parameters 308 comprises a plurality of parameters X1 1301, X2, 1302, . . . , Xn 1303. In this example, the LMS estimator 303.1 also receives a post search operational measure ("Y") 310 associated with the result of the search, wherein the post search operational parameter may be used to calculate an estimation error 1310, Err=Y−F. The estimation error 1310 may be used to adjust the controlling parameters Kq 1304, K2 1305 and Kn 1306 that affect operation of the LMS estimator 303.1. The change in each of the controlling parameters may be calculated using an LMS algorithm for each parameter change $$\Delta K_i = \mu*(Y-F)*K_i \text{ for each } i \quad [E3]$$

In at least some embodiments, a more accurate estimation is obtained by an AFE 303 that implements multi-layer neural network models.

It will be appreciated that the accuracy of estimation attributable to the AFE 303 is typically significantly affected by selection of input parameters and structure of the estimation function. In some embodiments the selection of input variables for the AFE 303 (hereinafter referred to as "cost function") is based on criteria including simplicity criteria ("C1"), relevancy criteria ("C2"), "divide and conquer" refinement criteria ("C3"), input variable factoring criteria ("C4"), and simple substitute criteria ("C5"). Simplicity criteria factor the ease of extraction of the input variables from various search states during the ME search process. Relevancy criteria account for the degree of relevancy of input variables to the target objective cost. The divide and conquer refinement criteria decompose a cost function F into separable contributing component functions F1, F2, etc. to simplify the function form for easy evaluation and tracking. Input variables factoring criteria decompose an input parameter $X_i$ into separable contributing components $X_{i1}$, $X_{i2}$, etc., thereby creating more input variables and promoting better accuracy, control and tracking. Simple substitute criteria substitutes one or more parameters to replace difficult to obtain parameters.

In an exemplary embodiment, a MOM 11 is used for searching based on N-dimensional image matching. Since the type of object sought is highly correlated and normally encoded through some kind of coefficient de-correlating transform such as Discrete Cosine Transform ("DCT"), Discrete Wavelet Transform ("DWT"), Discrete Hardmard Transform ("DHT") and Karhunen-Loeve Transform (KLT). Following transformation, derived signal energies are typically concentrated on a few low frequency bands. Based on this observation, a priori input parameters for AFE 303 may be selected from the energies in a plurality of low frequency sub-bands {E_0, E_1, . . . , E_i} and remaining high frequency residue energy E_hi. Embodiments adopting the simplest form of this "sub-band" decomposition may divide the energy into direct current ("DC") and alternating current ("AC") terms of a transform. Here the AFE result $R_{AFE}$ 303 can be approximated by $$R_{AFE\_}=F=K1*E\_dc+K2*E*E\_ac+\text{Others}, \quad [E4]$$

where E_dc is DC energy and E_AC is AC energy

Energy is typically calculated as a "sum of square value" of the components of an object. It will be appreciated, however, that computation may be reduced by using a "sum of absolute value" approximation. It will be further appreciated that this AC/DC decomposition estimation example utilizes criteria C1, C2, C3, and C4 as specified above. To achieve optimal search performance and quality, a set of different transforms may be used for search cost estimation and final result calculation. Transforms may also be adaptively selected to achieve the best performance and quality.

In other embodiments, criteria C3 may be applied by decomposing the AFE function into portions representing estimated values and accurate values. Since some of the estimation problem may include one or more exactly predicable portions that contribute to the operational measure, the predicable portion may be realized using a table look-up or simple function calculator, where the functional form is known.

Because the relevancy of a priori data significantly affects the accuracy of estimation, some embodiments place great weight on providing accurate estimation of a posteriori operational measures based on a priori data. For example, where queries involve object matching types, it is preferable to have complete object information available to compute a cost function. However, it is relatively commonplace that complete object information is not available because of bandwidth availability and cost, and for other reasons. For example, complete object information may not be available when query and search objects Oq and Os are physically residing in different locations of a network.

Figure 4:
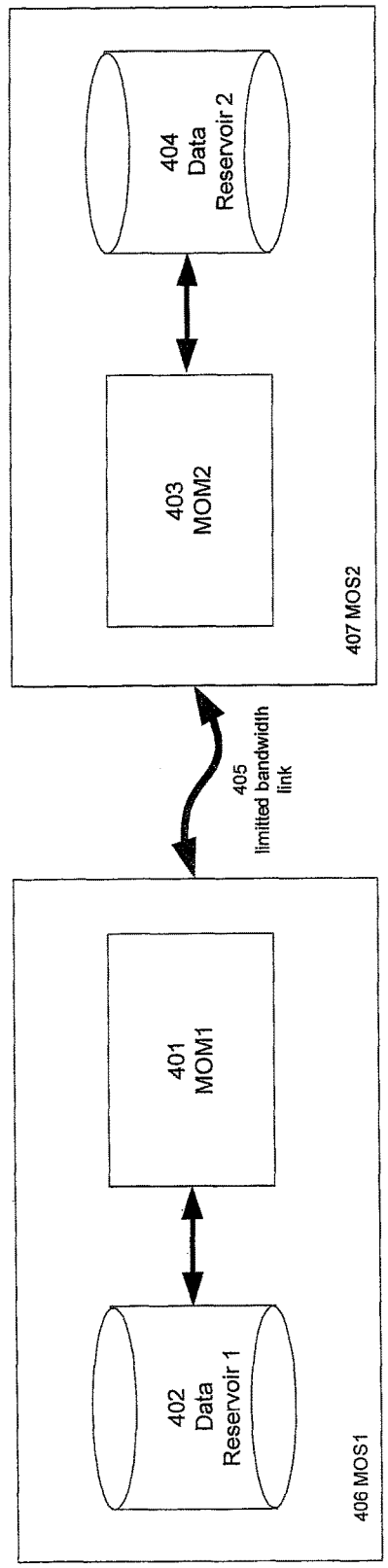
FIG. 4 illustrates a multimedia search problem with limited communication bandwidth

FIG. 4 illustrates an example in which object information is dispersed. In some embodiments, compensation is made by using certain extracted feature vectors of the objects (Wq and Ws) as inputs for the OME 21 (see FIG. 2). The size of Wq and Ws data is typically much smaller than the size of the original objects and, thus require lower transmission bandwidth.

The following is describes an embodiment of an operational measure estimator. BEGIN: Exemplar Operational Measure Estimator Declaration 1. A method for estimating operational measures associated with objects, comprising the steps of
   extracting a priori input parameters from a priori data available during the search,
   calculating an estimated operational measure of an expected search objective from the a priori input parameters,
   exploring objects from the search space,
   identifying objects optimizing the estimated operational measure,
   perform operation on optimally identified objects,
   extracting the a posteriori parameters from a posteriori data available after performing the operations on the identified objects,
   calculating the actual operational measure based on a posteriori parameters,
   adjust or reconfigure the operational measure estimator based on the estimation error.
2. The method of declaration 1, wherein the a posteriori data also includes information extracted from preceding queries and extracted from operational measures of search results associated with the preceding queries.
3. The method of declaration 2, wherein the operational measures are operational entropies quantifying information related to the objects, wherein the operational entropies are obtained from certain processes.
4. The method of declaration 1, wherein the estimated operational measure is calculated using a process including at least one of simplicity criteria, relevancy criteria, divide and conquer refinement criteria, input variable factoring criteria, and simple substitute criteria.
5. The method of declaration 1, wherein the estimated operational measure is decomposed into accurately predictable components and estimated components.
6. The method of declaration 5, wherein the accurately predictable components are obtained using a table look-up.

END: Exemplar Operational Measure Estimator Declaration

Topological Maps

Referring again to FIG. 2, embodiments of the invention employ topological maps to maintain the information related to the structure of various object spaces. For example, object indexing spaces used by the SOM 23 and QOM 24 may be implemented as topological maps for capturing the structure of an object search space and an input query object space, respectively. As used in embodiments of the invention, a topological map of objects is an object index space that includes definitions of neighborhood relationships between constituent objects. Examples of topological maps include N-dimensional lattice, tree, and graph structures. In some embodiments, topological maps may be hierarchical in form. A topological map may also have a hybrid structure composed of components maintained in different types of map, such as a combination of mixture of lattice and graph structured maps.

Figure 5:
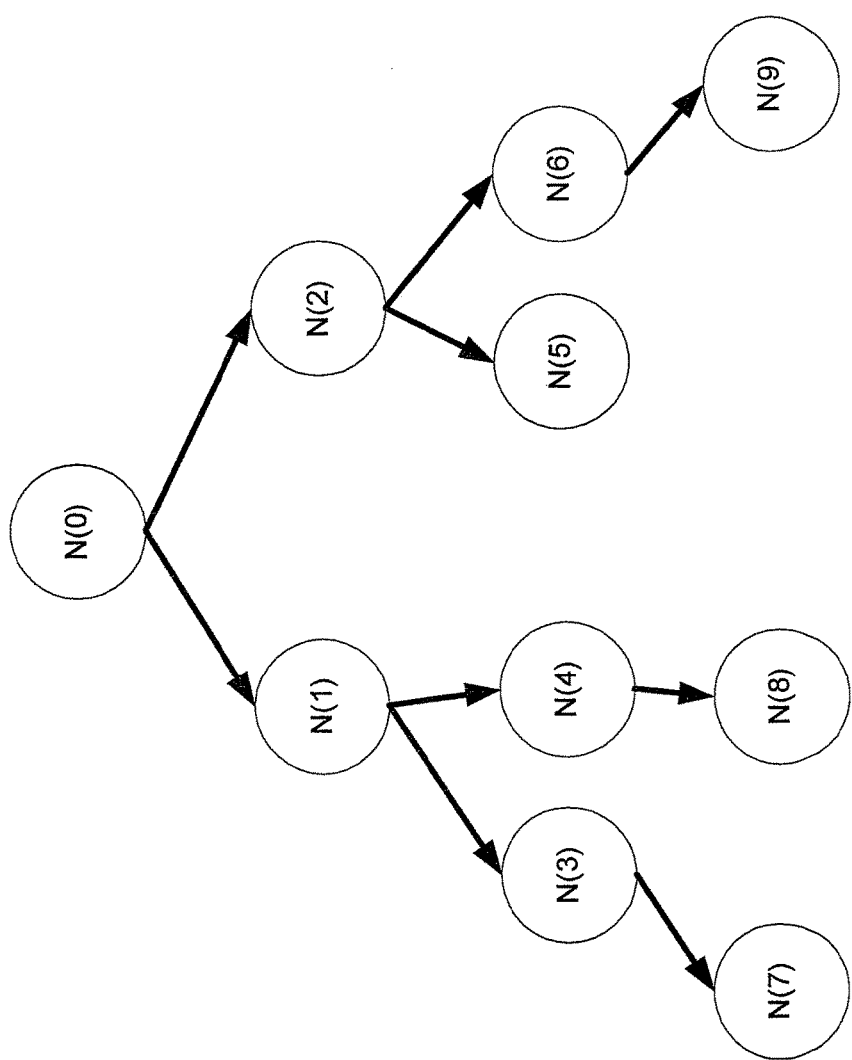
FIG. 5 shows an example of tree structured topological map.
Figure 10:
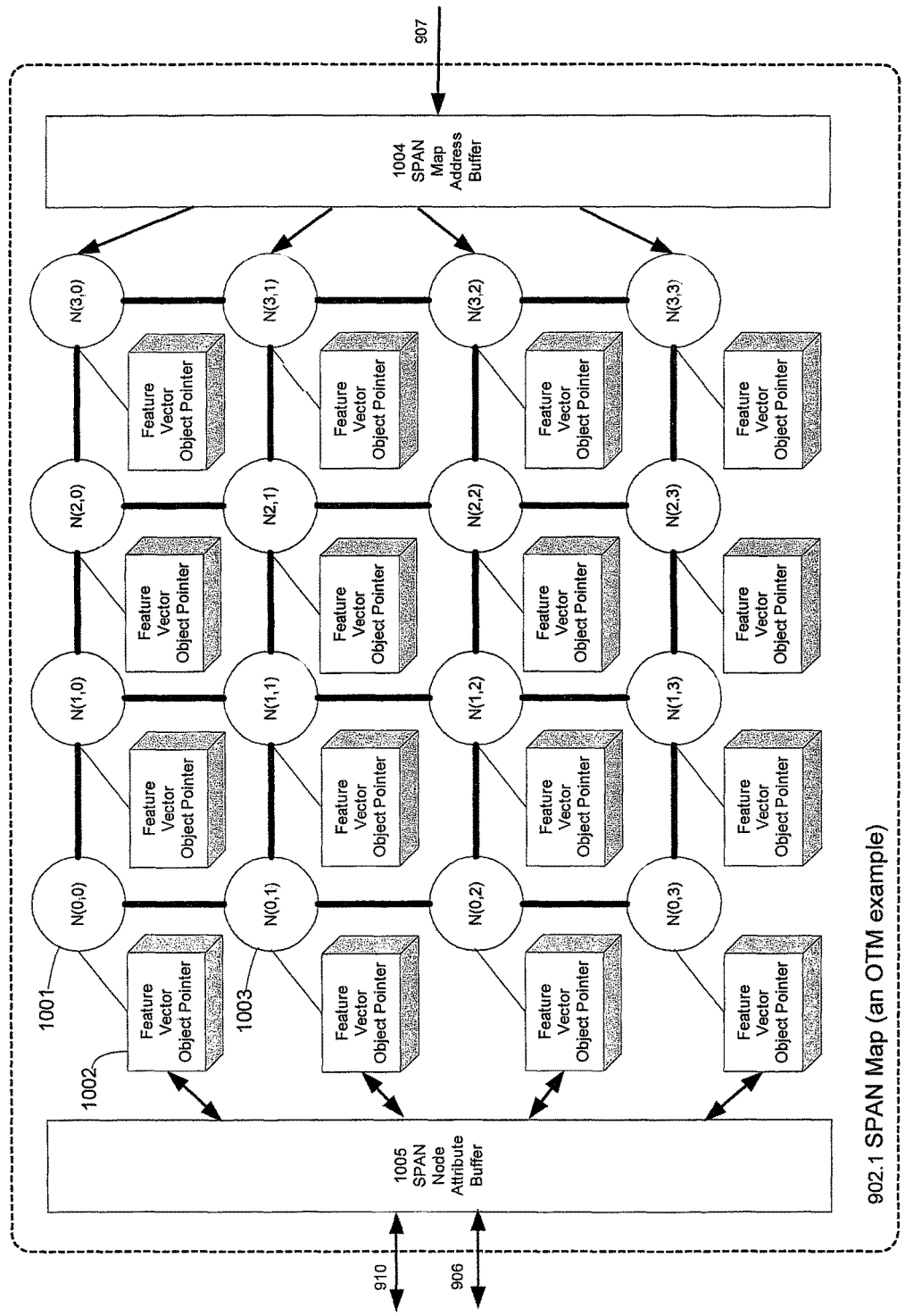
FIG. 10 shows an example of a lattice topological map.
Figure 17:
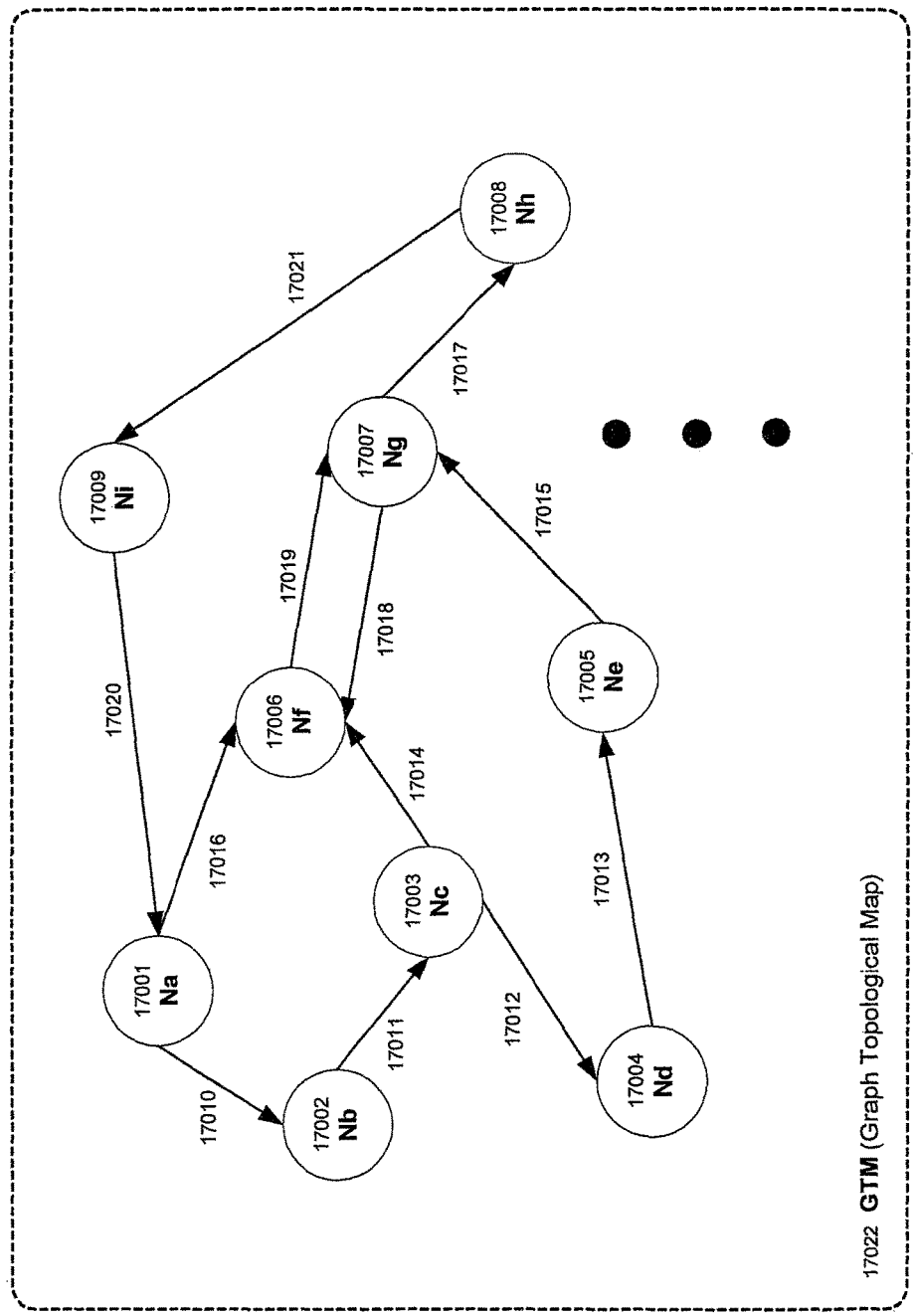
FIG. 17 shows an example of a graph topological map.

Examples of topological maps are depicted in FIGS. 5, 10 and 17. FIG. 5 shows an example of tree topological map, FIG. 10 shows an example of a 2-D lattice topological map and FIG. 17 shows an example of graph topological map. Embodiments of the invention utilize hierarchical N-dimensional lattice topological maps. Hierarchical N-dimensional lattices possess advantageous properties including:
- a "vector space" form in which each object on the space is associated with a lattice coordinate vector
- voids in the vector space (representing non-existent objects) can be filled by calculations or derivations based on characteristics of nearby (or local) objects in the lattice.
- a hierarchy structure that allows the map to be refined for optimizing search results and performance.

Figure 15:
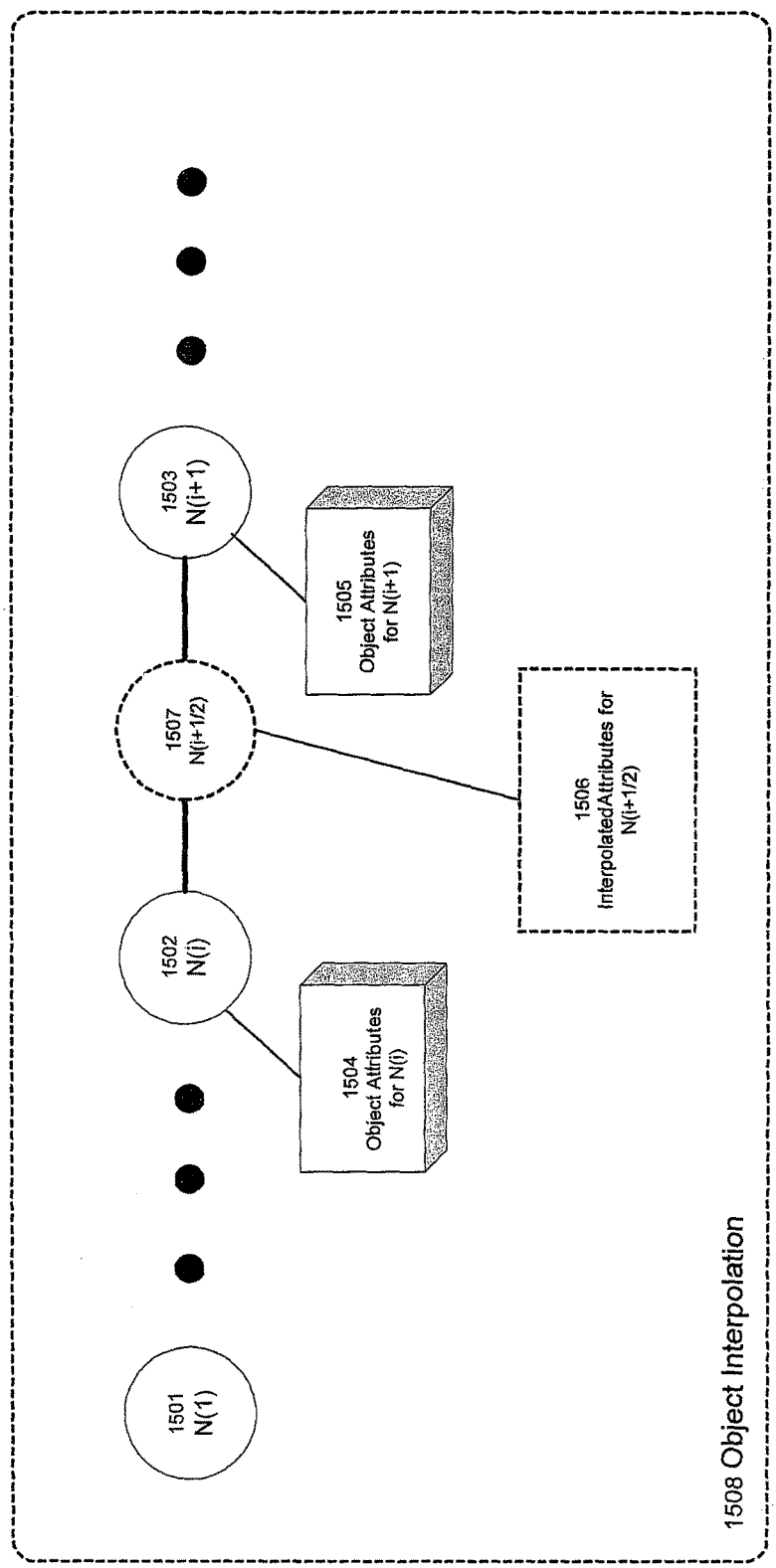
FIG. 15 shows an example of object interpolation from a lattice topological map.

An illustrative example is shown in FIG. 15. In the exemplary embodiment, a one dimensional lattice contains a plurality of nodes 1500 (N(1), . . . , N(i), N(i+1)). Object attributes 1504 of N(i) and attributes 1505 of N(i+1) may be used to "interpolate" attributes of non-existing object N(i+½) located between object N(i) and N(i+1) on the lattice. It will be appreciated that the complexity of the local computation can influence the quality of the derived object. Further, during the search process, a simplified calculation is typically used to quickly evaluate candidate lattice points. In at least some embodiments, multiple local computation methods are implemented and adaptively selected for deriving objects. For example, a first and simplest method such as linear interpolation may be used to locate a best approximation before more complex and accurate computation methods are applied to derive the object sought. This process includes the following steps:

During the search process, a simplest calculation such as linear interpolation is used to derive the objects on non-integer lattice points. For example, if $O(i)$ and $O(i+1)$ are objects represented by $N(i)$ and $N(i+1)$ on the lattice, then $O(i+\frac{1}{2})$ can be derived simply as $\frac{1}{2}*(O(i)+O(i+1))$.

After a best point is found using a calculation, more complex and accurate computation methods and combinations of methods may be selected are used to derive the object sought by the query. Selection may be adaptively made from a group of methods. In some embodiments, local signal processing operations such as "multi-tap" filters may be applied to derive more accurate contents for missing objects.

In addition to its use for deriving missing objects that reside on non-integer points of the lattice, the interpolation method may also be used for correcting error and omissions attributable to transmission and storage faults, and other problems associated with distributed network updates.

Figure 16:
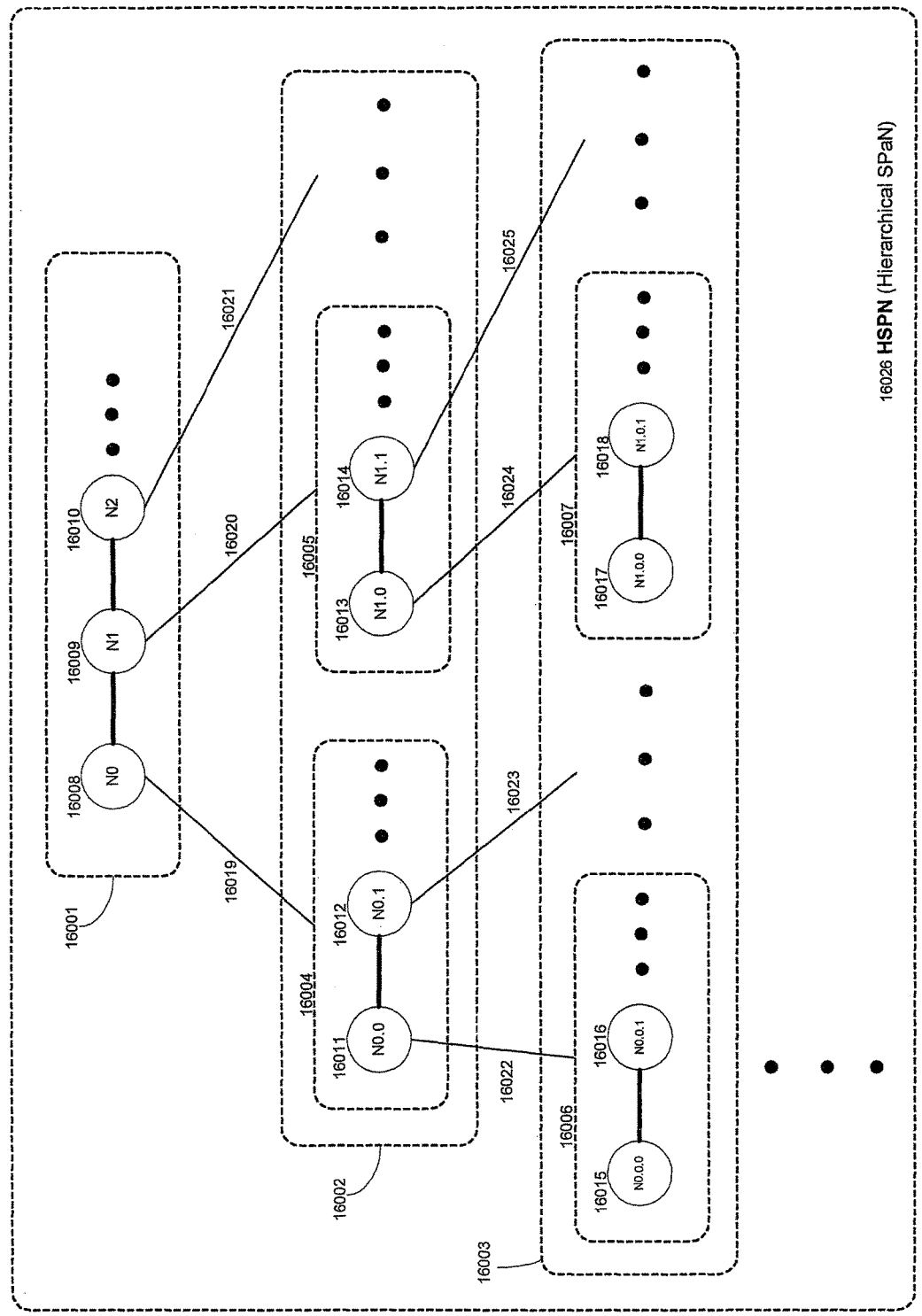
FIG. 16 shows an example of hierarchical topological maps.

An example is shown in FIG. 16, wherein in an embodiment of the invention, a 1-D lattice is organized hierarchically. Here the top level lattice 16001 contains the node N0 16008, N1 16009, . . . . The nodes N0 16008, N1 16009, . . . are expanded into lattices on the next level 16002, where N0 16008 is expanded into lattice 16004, with nodes N0.0 16011, N0.1 16012.

Figure 9:
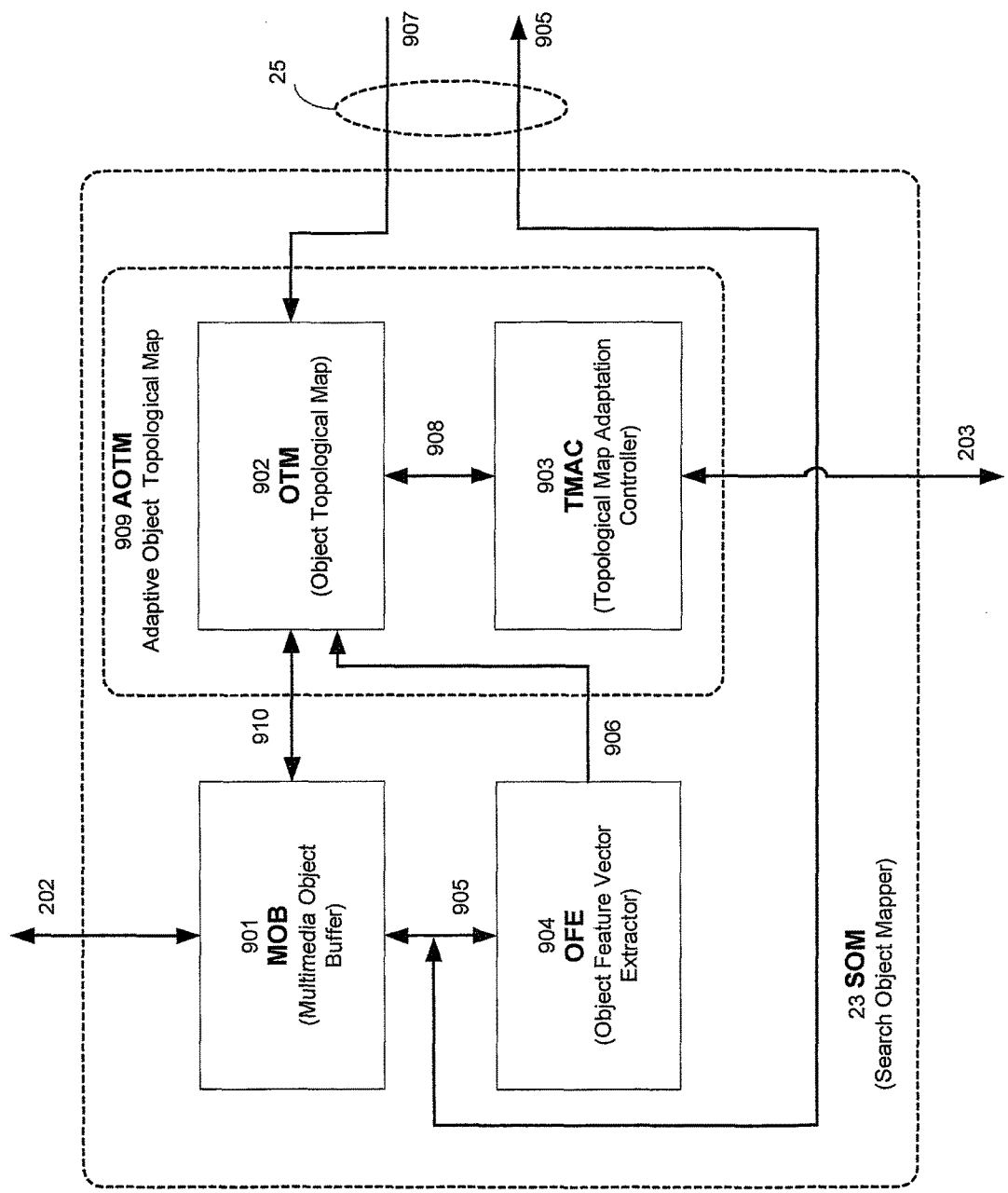
FIG. 9 shows the structure of a search object mapper (SOM)

Referring now to FIGS. 2 and 9, FIG. 9 shows an exemplary embodiment of the SOM 23. The SOM 23 typically organizes and arranges the structure of a multimedia object search space to enable fast and efficient searching for objects located in a large multimedia data reservoir. In the exemplary embodiment, SOM 23 comprises a multimedia object buffer (MOB) 901, an adaptive object topological map (AOTM) 909, an object feature vector extractor (OFE) 904, an object bus 905, an object map index bus 907 and an object pointer bus 910.

The MOB 901 is typically coupled to a MOM embedded communicator ("MEC") 28 and may assess the multimedia data exchanged by the MDR 13 (see FIG. 1). The MOB 901 is typically a fast multimedia object cache storage that can access and retrieve low-level multimedia data and organize the multimedia data to create higher level object forms, thereby facilitating processing. The MOB 901 may function as an object converter, bridging high level objects processed in the MOM 11 (See FIG. 1) and multimedia data stored in the network. The AOTM 909 can dynamically form a topological map of the search space and typically includes an object topological map (OTM) 902 (as discussed previously) and a topological map adaptation controller (TMAC) 903 for adjusting the structure of the object topological map (OTM) 902 based on certain learning algorithms.

The OFE 904 may extract feature vectors from an object to be sent to a feature vector bus 906. The feature vector is typically a set of values that characterizes an object and the feature vector can be used for object matching during searches and to enable content-based access of objects. In the latter use, the feature vector may be used to retrieve an object pointer from the OTM 902 using an object pointer bus 910.

The object bus 905 may be provided to permit fast object data transfer for various purposes including
  transmitting object data retrieved from the ODR 13 to OMP 22 through the MOB 901,
  sending the object data from OMP 22 to the ODR 13 through the MOB 901, and
  sending the object data to the OFE 904 for extracting the feature vectors of the object.

The object map index bus 907 is provided to transmit access requests by the OMP 22 to the object map. The object pointer bus 910 typically transmits the object pointer information to and from the MOB 901 to access object data in the MDR 13 through a bus 202 and the MEC 28 (as shown in FIG. 2). It can be appreciated that the bus 25 (as shown in FIG. 2) may comprise the object access request bus 907 and the object bus 905.

FIG. 10 depicts an object topological map (OTM) in an exemplary embodiment of the invention. The OTM is depicted as a two dimensional ("2-D") space partition network (SPAN) map 902.1, comprising: a plurality of 2-D lattice nodes (N(0,0), N(0,1), . . . ,) wherein each of the plurality of 2-D nodes is associated with node attributes 1002 including a pointer to an object, a list of objects (where the node represents a group of objects), and sub-maps (where a hierarchical topological map is used), a feature vector of the associated object and a SPAN Map Address Buffer 1004 for receiving a lattice address 907 used to retrieve objects indexed by the lattice node and a SPAN Node Attribute Buffer 1005 that stores node attribute information associated with the lattice.

Figure 12:
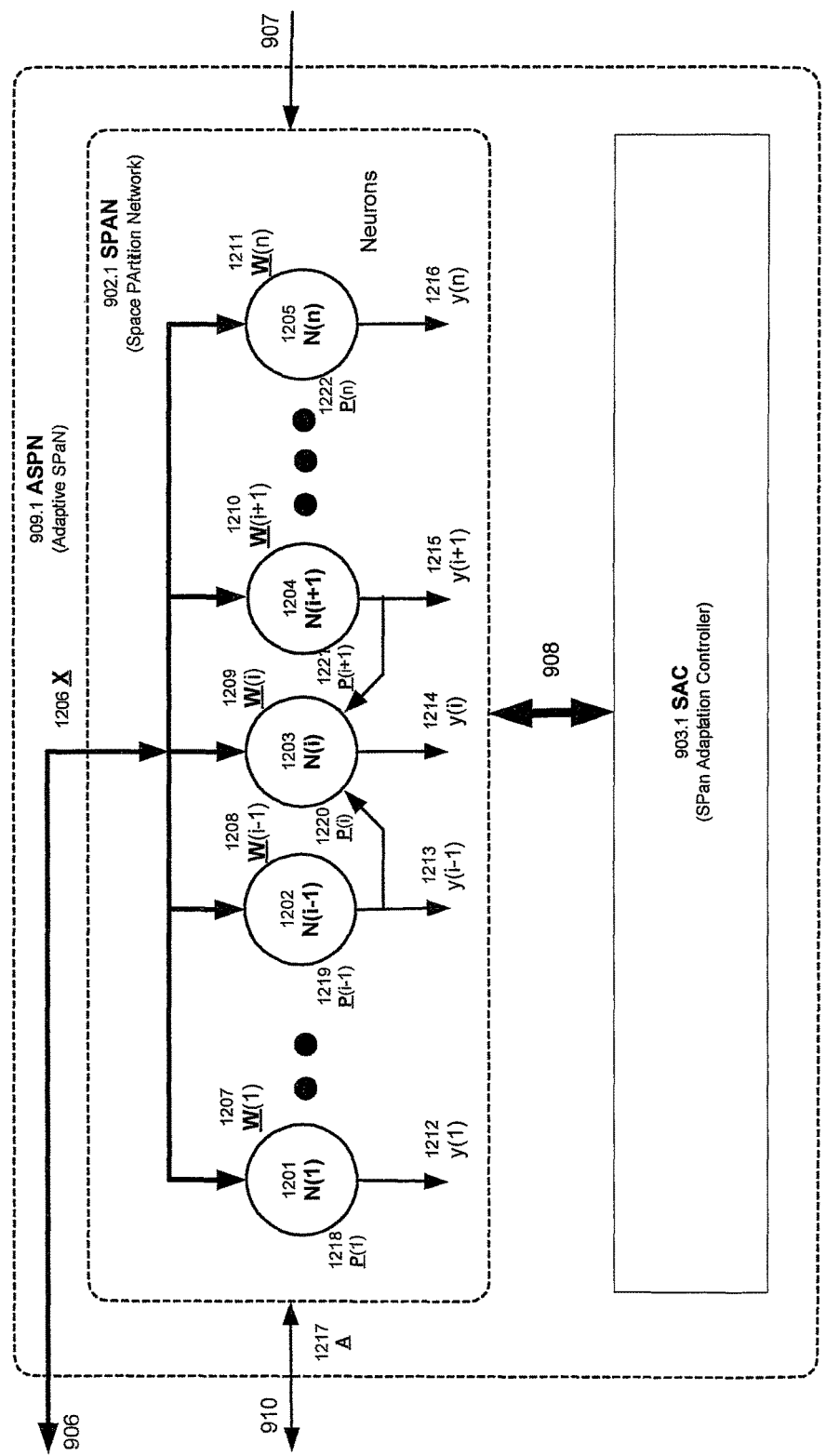
FIG. 12 shows the structure of a dynamically adaptable search object mapper (SOM)

Referring now to FIGS. 9 and 12, an exemplary embodiment of an AOTM 909 is shown in FIG. 12. In this embodiment, an adaptive SPAN (ASPN) 909.1 is used as the AOTM. Shown here is a 1-D SPAN with a plurality of nodes (N(1), . . . , N(i−1), N(i), N(i+1), N(n)). Each of the plurality of nodes corresponds to a neuron in the SPAN model and stores the attributes including an object feature vector W(i), which is the feature vector for the object represented by node N(i) and an object pointer P(i), which is the pointer pointing to the object, a group of objects, or a sub-map represented by the node N(i). SPAN map adaptation is controlled by a span adaptation controller (SAC) 903.1. In the exemplary embodiment, nodes in the SPAN 902.1 may be addressed by a lattice index and by a feature vector. The lattice index is typically sent from the map index bus 907 to locate an associated node in the lattice. The feature vector X 1206 may be sent through the feature vector bus 906 to be enable a "parallel compare" with feature vectors {W(i)} stored on each lattice node N(i) for identifying the nearest neighbor that matches.

Some embodiments of the invention implement an associative addressing method. An input feature vector X 1206 is provided to each neuron in the lattice for measuring a difference from the feature vector W(i) stored in each node N(i). The difference is typically a value measured using metrics that quantify relative distance of nodes. The "difference value", together with a weighted summation of the output from the neurons in the neighboring set S(i) is added together to generate the "pre-sigmoidal" activation level h(i) for neuron N(i). An output y(i) for neuron N(i) is typically generated by mapping h(i) through a non-linear signmod function f( ). The system converges through several iterations and the neuron (i.e., the node in the SPAN map) with the highest output value is selected as the closest match. The neighborhood set S(i) of a node N(i) on a lattice map of the exemplary embodiment is the set of nodes within a certain neighborhood region of node N(i).

Figure 11:
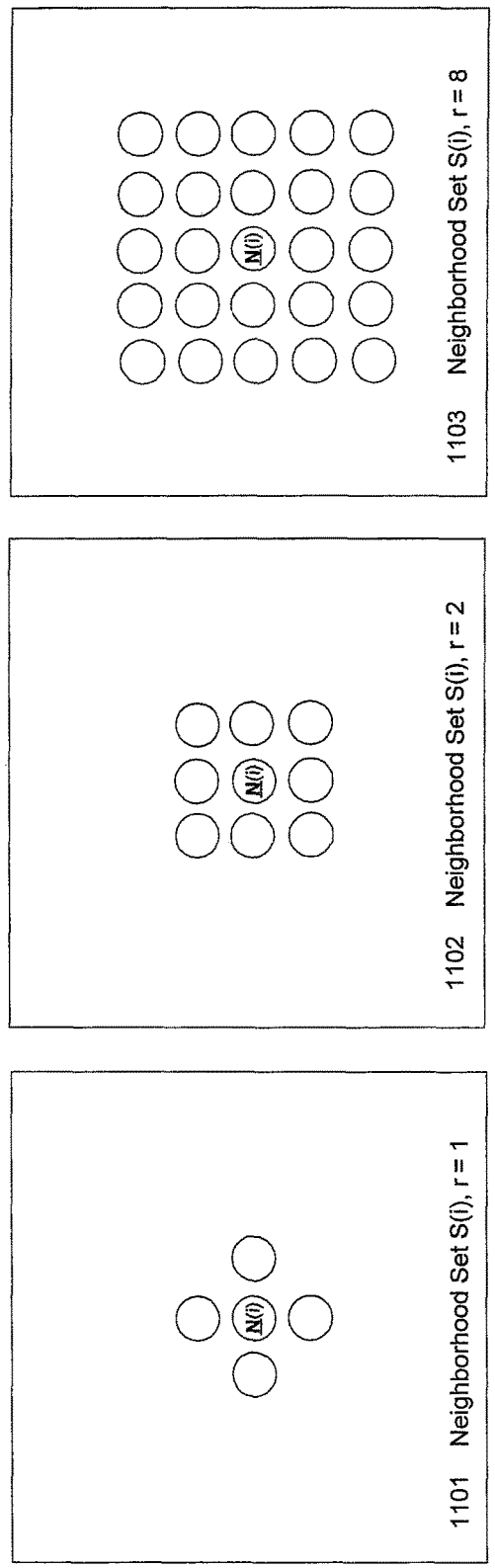
FIG. 11 shows examples of neighborhood sets on 2-D lattices.

Referring next to FIG. 11 three diagrammatic examples of the neighborhood sets on a 2-D lattice are shown. Using "r" to represent a maximum square of the Euclidian distance of the lattice index of the neighborhood node from the center node to label the set, the diagrams represent a neighborhood set S(i), with r=1 1101, a neighborhood set S(i), with r=2 1102 and a neighborhood set S(i), with r=8 1103.

Considering now the diagram of FIG. 12 together with FIG. 9, a neighborhood set S(i) contains two nodes N(i−1) 1202 and N(i+1) 1204 with output signals y(i−1) 1213 and y(i+1) 1215 respectively. These output signals may be added into the input of neuron N(i) using, for example, a weighted summation process. Weights are typically selected to provide a negative value in order to "inhibit" the activity of neighboring neurons. A resulting neighborhood "negative feedback" process may enable one dominant neuron to emerge within a minimal number of iterations.

An addressed node N(i) typically provides attributes such as W(i) and P(i) for various purposes. W(i) may be used for object matching and searching and P(i) may be used for accessing objects from the ODR 13 (as shown in FIG. 1) through multimedia object buffer (MOB) 901. Feature vectors can typically be communicated to other modules from the map through the feature vector bus 906. Object pointers can be communicated to other modules from the map through the object pointer bus 910.

For each SPAN map a node N(i) with a feature vector W(i) matching the input vector X in the nearest neighbor sense can be selected through a distance measurement. The distance between two vectors may be represented using the notation D(W(i), X) Preferably, D( ) should be defined to be consistent with the operational measurement described previously (see FIG. 3). It will be appreciated that the SPAN map structure described above is just one embodiment example of this invention. In general, other structures could be implemented including:
- a hybrid topological map
- a hierarchical topological map
- a map in which pointer P(i) of a node N(i) points to an object such that the feature vector is the feature vector value extracted from the object
- a map in which pointer P(i) of a node N(i) points to a set of objects such that the feature vector W(i) is the representative feature vector value of the set of objects pointed to through P(i)
- a map in which pointer P(i) of a node N(i) points to another map (of hierarchical or hybrid structure) such that the feature vector W(i) is the representative feature vector value of the objects in the structures under this node Embodiments of the invention provide a feature vector of an object that is an n dimension vector residing in a high dimensional space. For practical processing, this high dimensional space is mapped into a lower dimensional space. In mapping from high dimensional space to lower dimensional space, "topological relationships" (i.e. the neighborhood relationship) between objects are typically preserved.

Embodiments of the invention provide topology-preserving mapping. Topology-preserving mapping is provided when neighboring nodes on the topological map are also neighboring nodes on an original feature vector space. Additionally, in topology-preserving mapping, two nodes on the feature vector space are neighbors if they share a boundary surface or a point on Voronoi regions determined by the feature vectors {W(i)} of nodes {N(i)}, with all the points in a Voronoi region V(i) for node N(i) closer to W(i) than the feature vectors of other nodes.

FIG. 14 shows topology-preserving mapping featuring a 2-D feature vector and 1-D SPAN map as provided in an exemplary embodiment of the invention. The 1-D SPAN map contains nodes {N0, N1, N15}, where neighboring nodes have adjacent indexes. The location of each node represents the location of the 2-D feature vector on the feature vector space. Voronoi regions {V0, V1, . . . , V15} for the nodes are a set of points closest to the corresponding feature vectors {W0, W1, . . . , W15}. In FIG. 14, a first mapping 140001 is an example of topology-preserving mapping, since all the adjacent nodes on the 1-D SPAN map are also adjacent nodes on the 2-D feature vector space. A second mapping 14002 is an example of a mapping where topology is not preserved, since neighborhood relationships are not preserved. An examination of adjacent nodes N3 and N4 on the second mapping map are not neighbors in the feature vector space, since V3 and V4 are neighboring Voronoi regions.

In the exemplary embodiment of FIG. 14 and with reference to FIGS. 10 and 12, the SPAN map 902.1 has the following characteristics:
- nodes on the map may be "topologically ordered" as described above;
- nodes on the map typically partition the feature vector space into "decision regions" with the feature vector of each node locating at the center of each decision region;
- when the feature vector (the "input feature vector") of a query object is presented to the map through the feature vector bus 906, the node on the map with the feature vector closest to the input feature vector is typically selected;
- objects or sub-maps pointed to by the selected node may be further evaluated such that the best matching object for the query object may be selected.
- the SPAN map 902.1 may be used as an associative memory, which can retrieve associated objects based on the feature vectors.

In this exemplary embodiment, the map may be constructed according to the following procedure:
The object to be indexed is prepared as follows:
   input the set G of objects {O(n)} to be indexed,
   calculate the feature vector X(n) of each object O(n),
The lattice map is indexed as follows:
   initialize the lattice structure L with a set of nodes {N{i}},
   Initialize the feature vector W(i) and object list pointer P(i) for each node N(i) such that P(i)<-NIL, and W(i)<-Certain Initial Value, which is different from other nodes.
An example of a map training and indexing routine is presented as follows:

---

Map Training:

loop (time index t=0, t++, until converge) {
    random select an object O(n) from G;
    fetch the feature vector X(n) of O(n);
    select the node N(i) from the map, such that:
        D(X(n), W(i)) <= D(X(n), W(k)), for all N(k) in L;
    for (each N(j) in the neighborhood set S(i)) {
        W(j) <- W(j) + a * φ[t]( ||(i)–l(j)| ) * D(X(n), W(j));
    } end for;
} end loop;
Where,
o   D( ) is a distance measure, which measures the distance between feature vectors;
o   α is the learning rate, which is used to control the rate of convergence in the learning process;
o   ||(i)–l(j)| is the lattice distance between node N(i) and N(j) on the map;
o   φ [ ]( ) is the spatial mast,
    ■  φ [ ]( ) is a time varying function used to control the range of influence of a lattice node to other nodes on the lattice;
    ■  φ [ ]( ) is selected in such a way that the influence range is wide in the beginning of gradually decreases to a minimum value close to the end of the training process, then both fast convergence and final representation accuracy can be achieved.
Object indexing:
for (each object O(n) in G) {
    fetch the feature vector X(n) of O(n);
    select the node N(i) from the map, such that:
        D(X(n), W(i)) <= D(X(n), W(k)), for all N(k) in L;
    attach O(n) to P(i);
} end for;

---

The procedure shown above demonstrates an exemplary embodiment of indexing the objects onto a lattice structure, through a parameter level feature vector training process. The lattice structure of the map may also be adjusted through certain node generation and annihilation processes. The generation and annihilation process can be based on activities and information representation contents associated with the node. This structure level adaptation of the map can also be governed by an operational measure, which measures certain resource utilization, performance/quality trade-offs of the system. It will be appreciated that the QOM 24 in the exemplary embodiment shown in FIG. 2 has a similar structure to the SOM shown in FIG. 9.

MOM Search Process

In many embodiments, the performance of the MOM 11 is optimized by the establishment and maintenance of topological maps including maps used by the SOM 23 and the QOM 24. These two maps provide for the capturing of topological structure of search and query spaces respectively. The topological structure of the input query map and object search map provide the ability to execute efficient search processes that leverage the topological structure of the maps.

Figure 18:
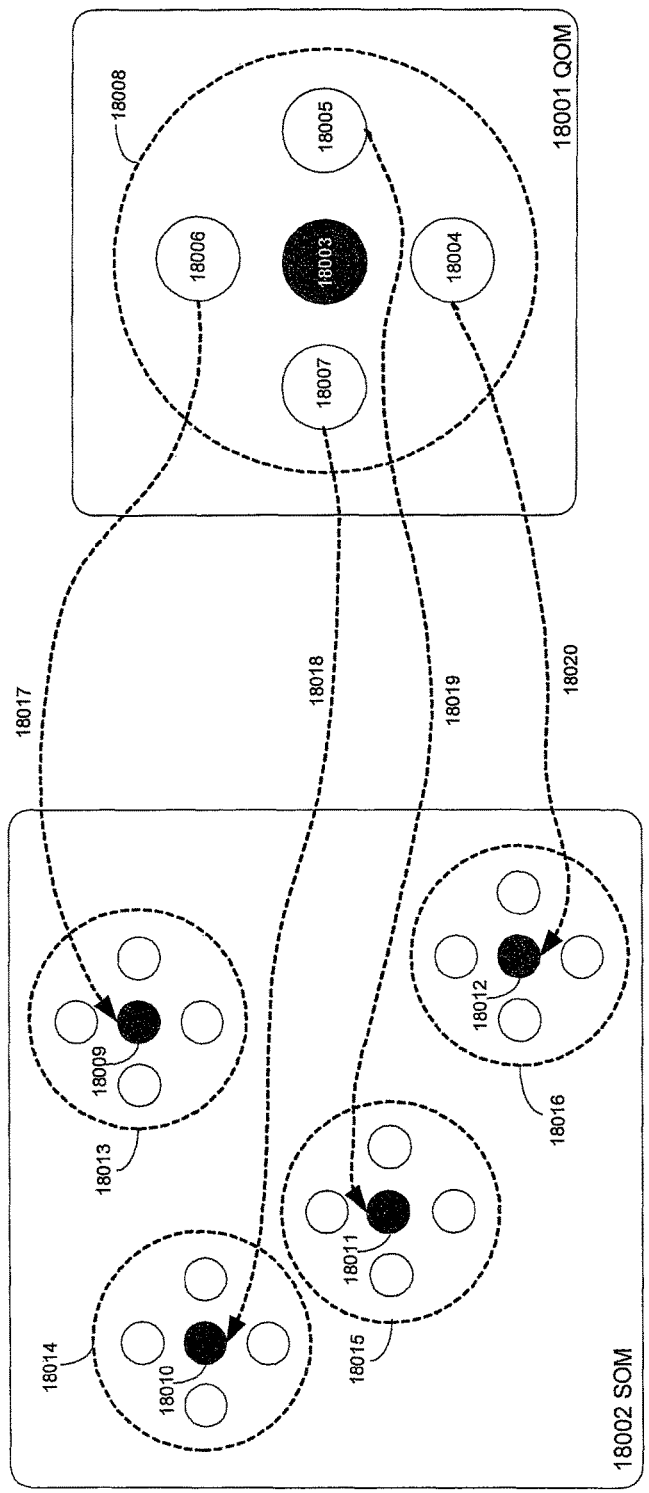
FIG. 18 illustrates a method for exploiting neighborhood sets to select a search starting point.

FIG. 18 shows an example of a search process that leverages the neighborhood structure of the two maps. A current query node 18003 on a query object map (QOM) 18001 has four neighboring nodes 18004, 18005, 18006, 18007, which index a previously obtained set of query results in an SOM 18002. In the SOM 18002, the nodes 18012, 18011, 18009, 18010 representing the previously obtained query results have neighborhood sets (see FIG. 11) 18016, 18015, 18013, 18014.

A starting point on the SOM 18002 is preferably may be selected by evaluating all points in neighborhood sets on the SOM, where the neighborhood sets are referred to by the neighboring points of the current query point 18003 on QOM 18001. Then the point yielding a best operation measure value is selected as the starting point.

Once the starting point is selected, the search process will be followed by conducting a detailed search around the neighborhood region of the starting point. This process may establish the best operational measure result as a threshold. In many instances, this detailed search generates optimal results.

Next, the MOM 11 executes a selected global search process, typically designed to explore large territories with an objective of reaching neighborhoods of better points. Additionally, the global search minimizes the risk of being trapped in a local minimum during the search process.

As with any general search problem, existing search strategies and algorithms may be implemented to execute a detailed or global search process. However, aspects of the present invention permit the execution of other search techniques to obtain good search results using the described topological maps and operational measure cost functions.

For example, an "A* search," as known in the art, may be used to skip search points if a lower bound of the cost value for an object can be provided during the search process. Specifically, if the lower bound is already larger than the best cost value obtained so far, then there is no point to evaluate this candidate point. Additionally, termination criteria for "success" or "failure" can be based on certain threshold parameters, which can also be adaptively adjusted based on the context of the search through certain learning processes. With a "successful match" or "acceptable match" termination condition set, in some embodiments, a spiral search pattern can be executed around an optimal starting point to minimize the time required to obtain an acceptable outcome. Also, if the search is sequenced according to a monotonically increasing order of certain contributing factor $X_c$ of the cost function search points, then the search process can be terminated if, at a certain point, the $X_c$ value is larger than the best cost value obtained so far.

Figure 19:
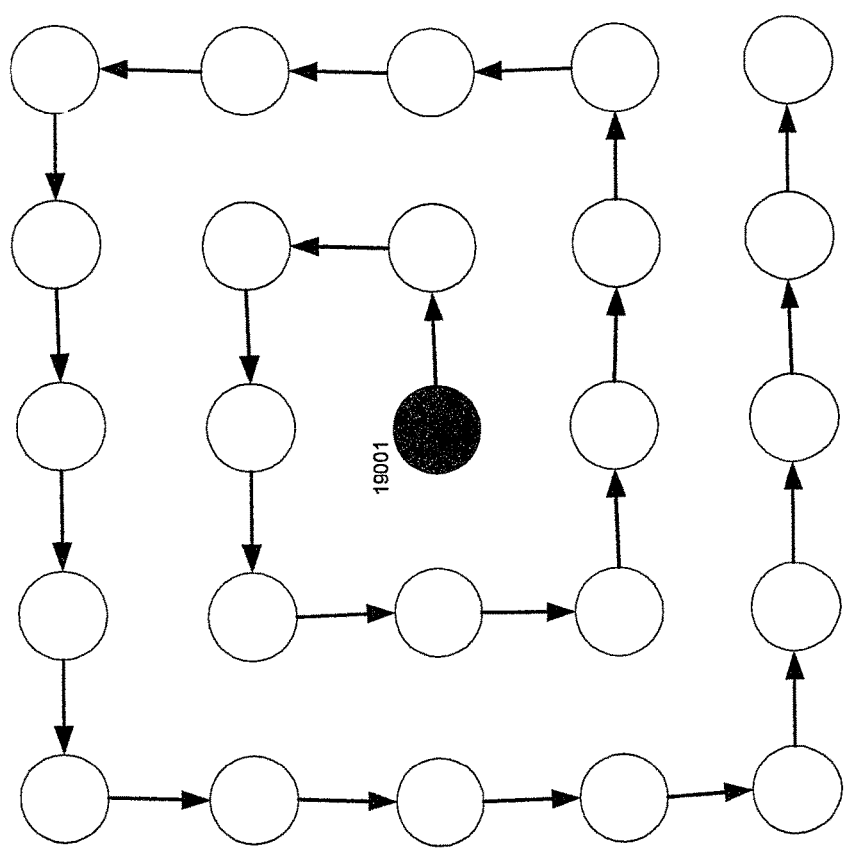
FIG. 19 illustrates the concept of a spiral search method.

Referring to FIG. 19, an example of a 2-D spiral search is shown. In the example, the search process spirals around a starting point 19001. Embodiments of the invention utilize a neighborhood "experience" based on past query results (as discussed previously). In these embodiments, the starting point 19001 may be the best pick based on prior query experience. Additionally, because the SOM 23 preserves the topology property of the feature vector space, a spiral process can find the optimal point from the starting point with generally the least number of the search points.

Figure 26:
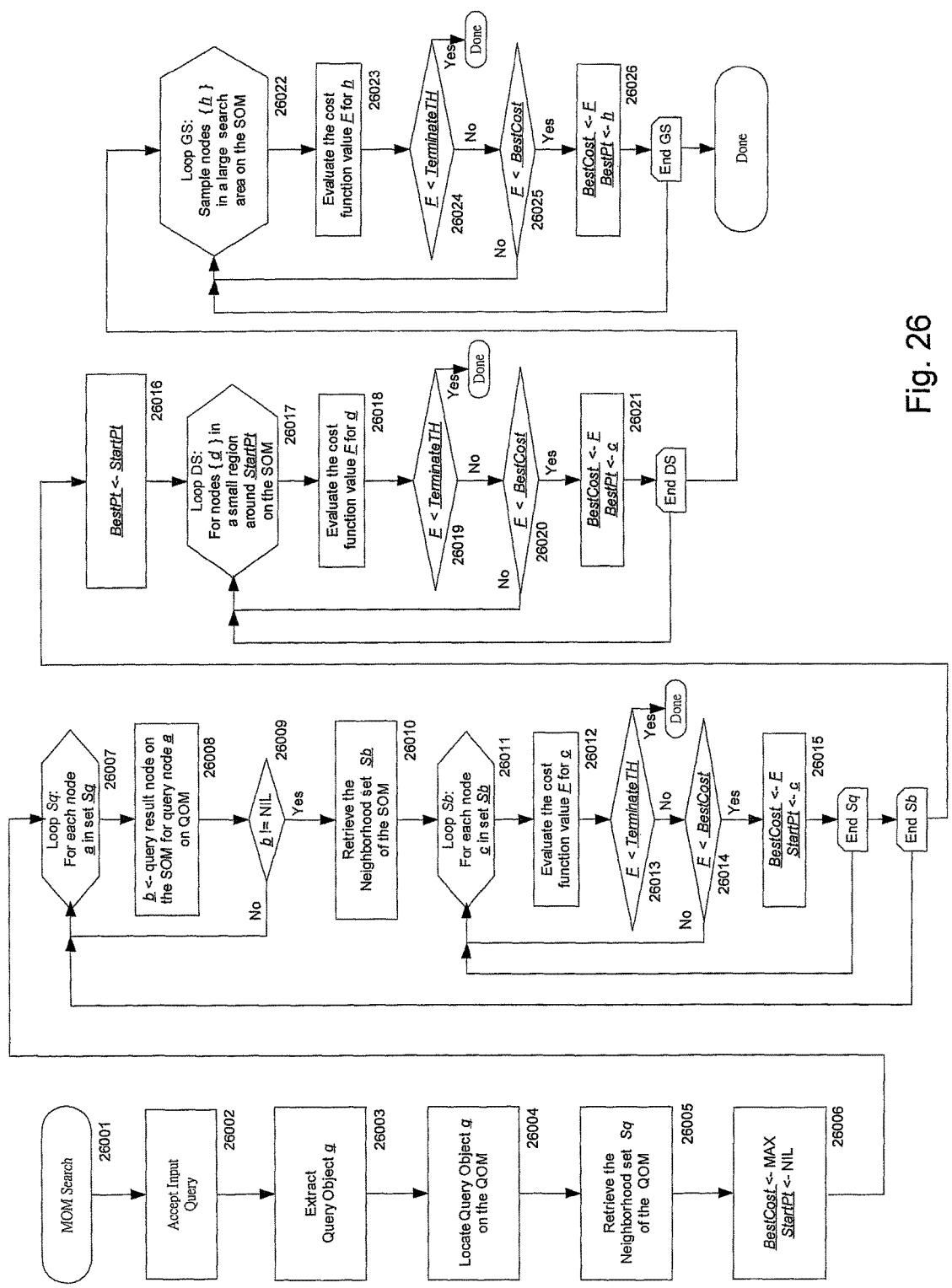
FIG. 26 shows a flowchart of a search process for a MOM.

Referring now to FIG. 26, the flow chart describes a MOM search process used in many embodiments of the invention. At step 26002, MOM 11 accepts an input query and, at step 26003, extracts the query object g. Next, the query object g is initially located on the query object map (QOM) at step 26004. Then the neighborhood set Se of query object g on the QOM is retrieved at step 26005. Thereafter, the best cost function value BestCost is initialized to the maximum value at step 26006. A loop at steps 26007-26015 (comprising loops at steps 26007-26010 and 26011-26015) exploits the neighborhood sets of the query result nodes of the nodes to select the starting point StartPt for the search at step 26016. This "double neighborhood set" exploit process is also shown in FIG. 18.

Next, at steps 26017-26021, the MOM 11 executes a detailed search loop to closely evaluate a small region around the StartPt. The spiral search process of FIG. 19 can be used to visit all the points in the small region. After the detailed search process, the MOM 11 executes global search loop at steps 26022-26026 for sampling throughout a large area on the SOM 23. During the search process, if any node yields a cost function value F smaller than the previously obtained termination threshold value, then the search process is terminated, and the object represented by the current node is selected as query result. At the end of the process, the best object BestPt, and the best cost value BestCost are obtained, representing the best object and the corresponding best cost function value found throughout the search process.

The search process provided in these embodiments is very efficient because of search behaviors including:

Exploitation of neighborhoods and detailed search process generally visit a constant number of points, i.e. with complexity O(1).

In most cases, a good match is found (hence the process will terminate early) during the neighborhood exploitation or detailed search process In embodiments using a hierarchical search process, the global search process scales up with a size A of the search region on O(log(A)).

Object Oriented Processing Unit (OOPU) and Object Oriented Memory Unit (OOMU)

In real world multimedia search problems, the resource requirements on signal processing and matching calculation for MOM 11 to search a large space can be very demanding and the resource requirements for different queries can be quite different and unequal. For practical implementation of the OMP 22 processor shown in FIG. 2 embodiments of the invention provide scheduling for search processes and allocate resources in OMP 22 to provide the best results. The OMP 22 is typically controlled using dynamic and adaptive control techniques based on local query context statistics to enhance the system throughput and quality of the query results. Additionally, supervised learning methods may be used to dynamically control the OMP 22 to improve operational performance.

Intrinsically, data processing independency exists in the search and query objects. In many embodiments, systems with high performance throughput may be developed with the following considerations:

Higher performance throughput can be achieved, when intrinsic spatial and temporal parallelism in the objects is exploited.

As shown in FIG. 2, the OMP 22 (processor) and the maps QOM 24 & SOM 23 (memory) are preferably designed to match the nature of the object to provide the best results. This would suggest object oriented implementation for the processor and storage structures for the system and thus into concepts of object oriented processing units (OOPU) and object oriented memory units (OOMU).

Figure 6:
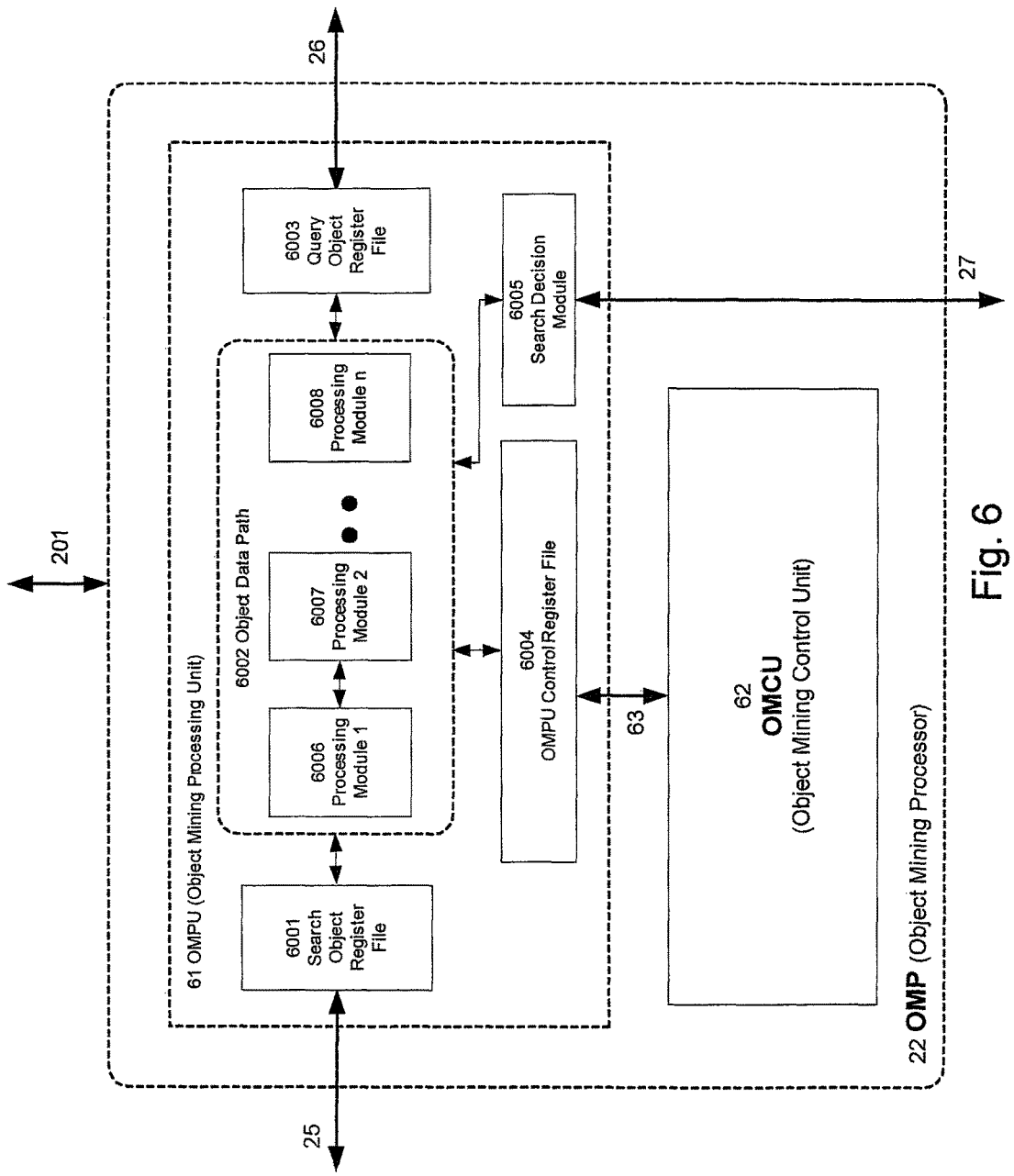
FIG. 6 shows the structure of an object mining processor (OMP)

The drawing of FIG. 6 illustrates an embodiment in which an object oriented processing unit (OOPU) is implemented within the OMP 22. An object mining processing unit (OMPU) 61 is provided as a processing resource to handle the object mining data and signal processing operations. The OMPU 61 typically comprises:

A search object register file 6001, for storing and retrieving search object data to and from the SOM 23 (as shown in FIG. 2) using bus 25;

A query object register file 6003, for storing and retrieving search object data to and from the QOM 24 (as shown in FIG. 2) through bus 26;

An object data path 6002, typically composed of object based processing modules 1, 2, . . . , n (6006, 6007, . . . , 6008), that may be structured to address semantics, spatial, and temporal independency and parallelism intrinsic in the objects to be processed, wherein the structure may be pipeline, parallel and concurrent;

An OMPU control register file 6004, for storing control parameters to allow the object mining control unit (OMCU) 62, to adaptively control the object data path 6002 and achieve optimal performance throughput. The control parameters may determine the resource allocation, scheduling, and processing options of the object data path 6002;

A search decision module 6005, for making decision about search results based on the cost function value calculated by the operational measure estimator (OME) 21 (as shown in FIG. 2).

Figure 20:
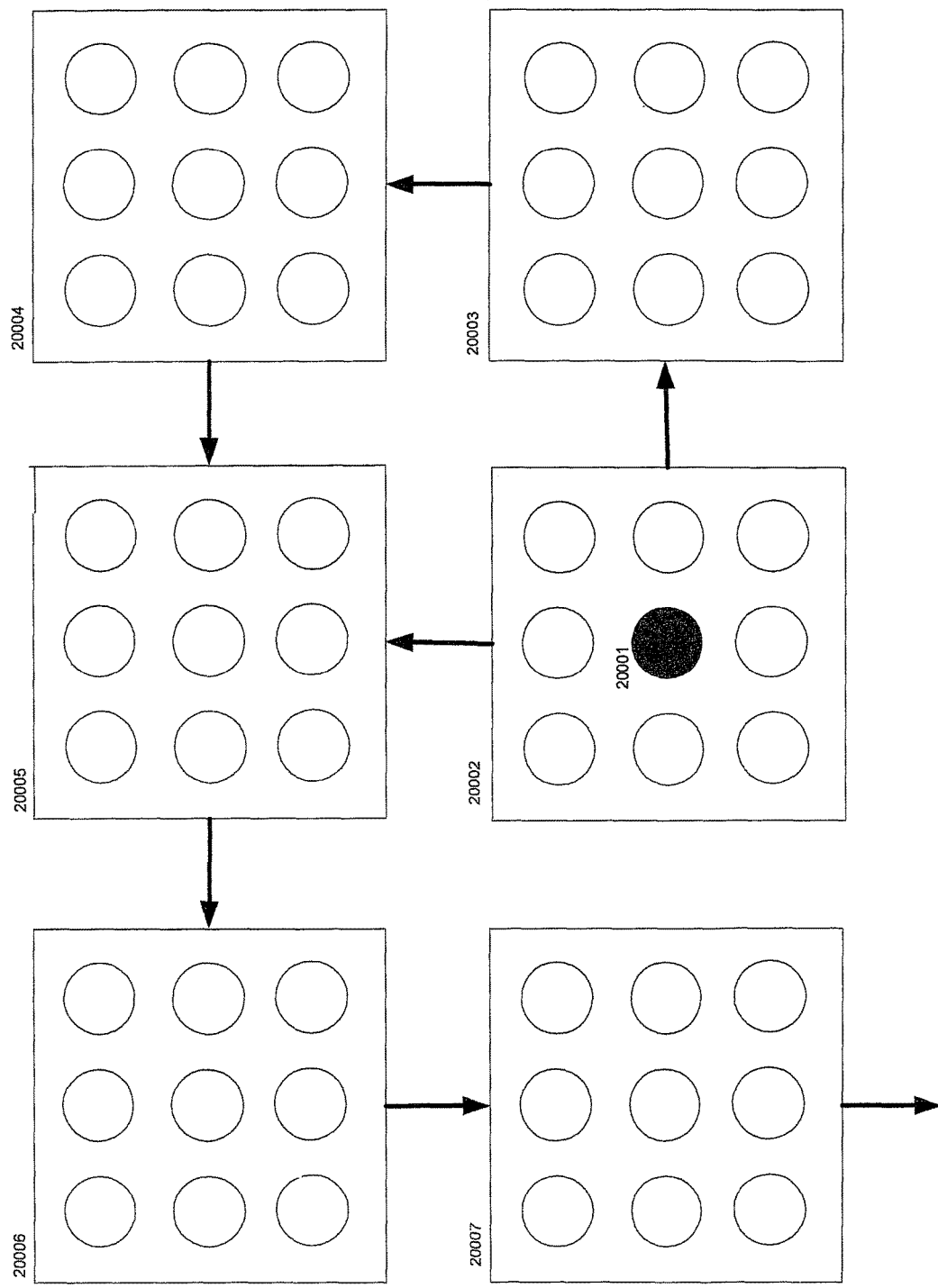
FIG. 20 shows an example of a parallel spiral search on 2-D lattice map.

The OMCU 62 is typically used for controlling and guiding the operation of OMP 22 in performing search and computation processes, using certain control parameters. Control parameters of the OMP control processes may include:

A search range in a map that may be dynamically adjusted based on search range results from previous queries Criteria for search termination that may be based on some adaptable threshold parameters As an illustrative example of the OOPU, in a 2-D topology map structure, given the search starting point 20001, a 3×3 array processor may be included in the object data path 6002 (of FIG. 6) to evaluate nine search points simultaneously. With this array OOPU, a spiral search process, as described previously, may be modified to operate as one or more parallel processes as shown in FIG. 20. The nine points are evaluated as a block simultaneously, starting from block 20002, then following the sequence of 20003, 20004, 20005, 20006, 20007, . . . . In general, a processor array may evaluate all points in one neighborhood set (as shown in FIG. 11) simultaneously. The neighborhood set can be 3×3, 5×5, . . . in 2-D case, or 3×3×3, 5×5×5, . . . in 3-D case, etc.

The following is the declarative description of an embodiment of an OMP 22 based on the OOPU structure described above.

BEGIN: Exemplar OMP Declaration

1. An object mining processor, comprising
   a processing unit for receiving object data and performing a plurality of object search and computation processes on the object data, the processing unit including
      at least one search object register for maintaining search object data,
      at least one query object register for maintaining query object data, and
      an object data path configured to receive the search object data from the search object register and receive the query object data from the query object register and perform selected processes of the plurality of processes on the search object data to obtain one or more search results, and
   a control unit for controlling the operation of the processing unit according to certain control parameters.

2. The object mining processor of declaration 1, wherein the plurality of signal processing operations includes processes for the manipulation of semantics, spatial independency, temporal independency and parallelism intrinsic in the objects.

3. The object mining processor of declaration 1, wherein one or more of the processes is performed by a signal processor.

4. The object mining processor of declaration 1, wherein the object data path is configurable as a pipeline processor.

5. The object mining processor of declaration 1, wherein the object data path is configurable as a parallel processor.

6. The object mining processor of declaration 1, wherein the object data path is configurable as a concurrent processor.

7. The object mining processor of declaration 1, wherein the control unit comprises
   a control register for storing control parameters used by the processing unit, and
   a search decision module for generating the one or more search results, wherein the results are generated based on search criteria obtained from the query object data.

8. The object mining processor of declaration 7, wherein the search criteria include optimizing attributes of a cost function value calculated by an operational measure estimator.

9. The object mining processor of declaration 1, wherein the control parameters configure options including resource allocation, scheduling and object data path processing.

10. The object mining processor of declaration 1, wherein the control parameters include
    a search range in a map wherein the search range is dynamically adjusted according to prior search results obtained from previous queries, and
    criteria for search termination based on adaptable threshold parameters.

11. The object mining processor of declaration 1, wherein the processing unit includes a multitasking environment and wherein the control unit prioritizes the computation processes and manages allocation of processor resources for each of the processes.

12. The object mining processor of declaration 11, and further comprising a scheduler for allocating processor time for each of the processes.

END: Exemplar OMP Declaration

The throughput for data access from the topological maps is very important for the overall performance of the MOM 11. To optimize the throughput, design of the storage structure, i.e., the OOMU is adapted to support intrinsic spatial and temporal data independency. Notice that OOPU and OOMU are closely related with the data access method of OOPU reflected in the OOMU structure.

Figure 21:
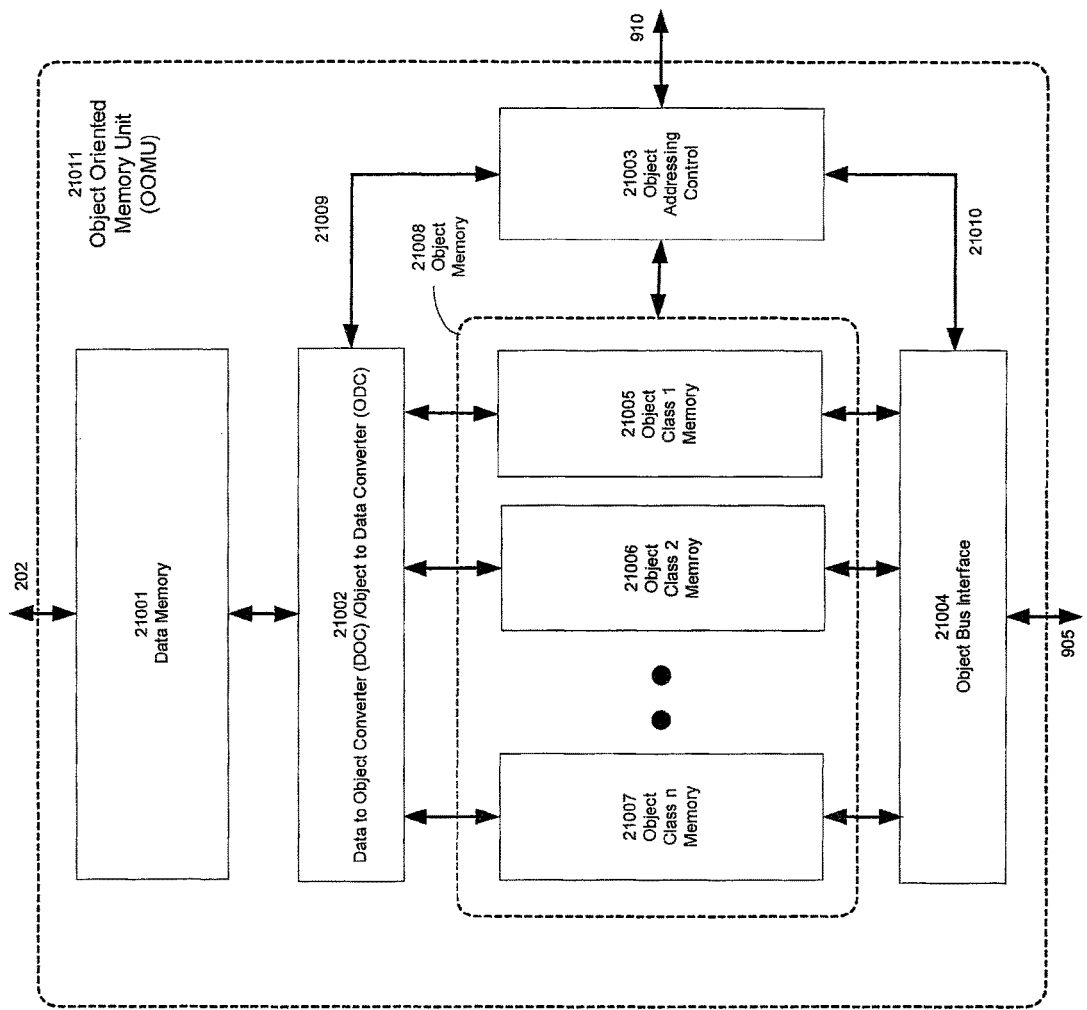
FIG. 21 shows the structure of an object oriented memory unit (OOMU)

The drawing of FIG. 21 shows an example of an object oriented memory unit (OOMU) 21011 as provided by embodiments of the invention. The OOMU 21011 may be used to implement the MOB 901 (as shown in FIG. 9). The OOMU 21011 typically comprises a data memory 21001, and object memory 21008, a data-to-object converter/object-to-data converter ("DOC/ODC") 21002, an object addressing control 21003 and an object bus interface 21004. The data memory 21001 may be implemented using general purpose mass storage memory, such as commonly available SDRAM, for storing large amounts of multimedia data typically retrieved from the MDR 13. The object memory 21008 is typically memory that is configured to receive independent object partition classes. For example, an object may be partitioned and stored as one or more object classes in the object memory 21008 such that spatial and temporal data dependency in the objects may be exploited by retrieving multiple object partition classes concurrently. The DOC/ODC 21002 may be implemented as a bidirectional bridge between data memory 21001 and object memory 21008. The object addressing control 21003 provides access to objects from the OOMU 21011. The object bus interface 21004 is a high speed interfacing circuit which allows concurrent access of the object partition classes and bridges the object memory 21008 to the external object bus 905. To further balance performance and cost, multiple level memory caching structures can be included in both the data memory 21001 and object memory 21008.

The following is the declarative description of an embodiment of an MOB 901 based on the OOMU structure described above.

BEGIN: Exemplar MOB Declaration
1. A multimedia object buffer, comprising
    an object memory configured to receive independent object partition classes,
    an object addressing control for relating associated independent object partition classes, wherein the associated independent object partition classes are members of a single multimedia object, and
    an object bus interface for providing multiple concurrent accesses to the object memory, wherein the object partition classes include partitioned information through certain perspective (e.g., spatial and temporal) related to one or more objects.
2. A multimedia object buffer according to declaration 1, further comprising
    a data-to-object converter for receiving data from storage, extracting one or more object partition classes from the data and storing the one or more object partition classes in the object memory, and
    an object-to-data converter for receiving associated ones of the independent partition classes, combining the associated ones to form structured data and storing the structured data in the storage.
3. A multimedia object buffer according to declaration 1, further comprising a data store for storing large amounts of multimedia data.
4. A multimedia object buffer according to declaration 3, wherein the storage includes a portion configured to store data in a multilevel hierarchy.
5. A multimedia object buffer according to declaration 4, wherein the data store includes servers connected to the Internet and wherein the multimedia object buffer further comprises a network interface for connecting to the Internet.

END: Exemplar MOB Declaration

MOS, MOSNET, AND MOMNET

Figure 7:
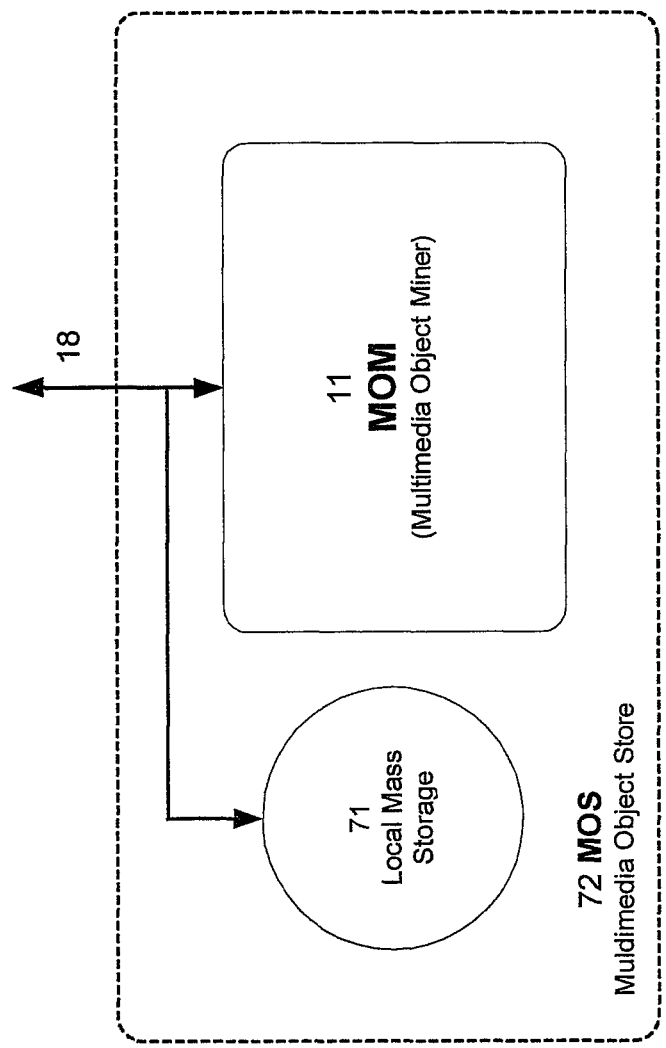
FIG. 7 shows the structure of a multimedia object store (MOS)
Figure 8:
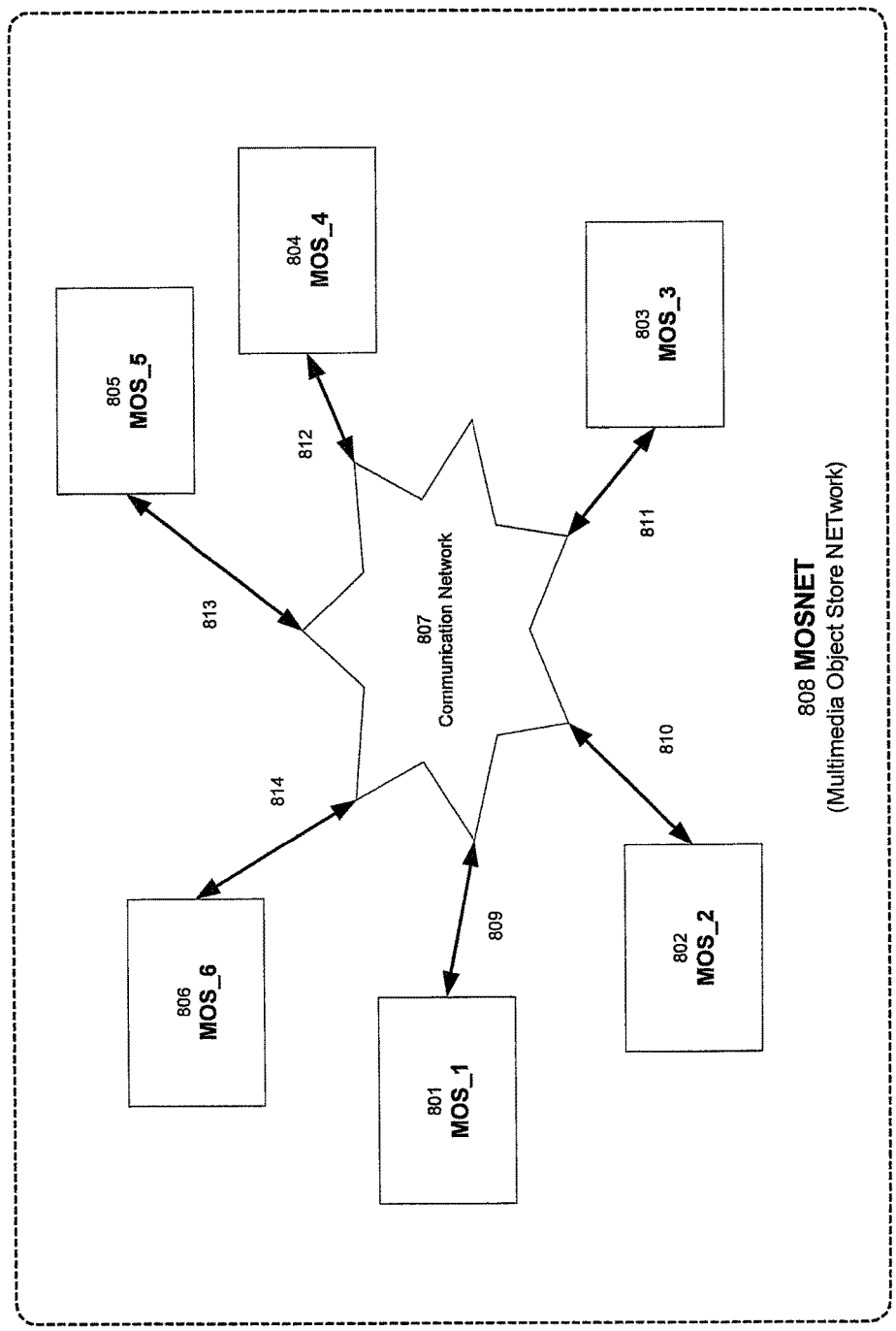
FIG. 8 shows the structure of a multimedia object store network (MOSNET)

Referring now to FIGS. 7 and 8, the logic structure of a media object store (MOS) 72 is shown in FIG. 7. The MOS 72 comprises a multimedia object miner (MOM) 11, a local mass storage structure 71 and a communication link 18, which connects certain communication network structure. Multiple MOS components be linked together, through the communication network to form a multimedia object store network (MOSNET). FIG. 8 shows the logic structure of a MOSNET. It will be appreciated that, by way of example, inclusion of one or more MOM agents in the Internet could cause the Internet to function as a MOSNET.

Figure 25:
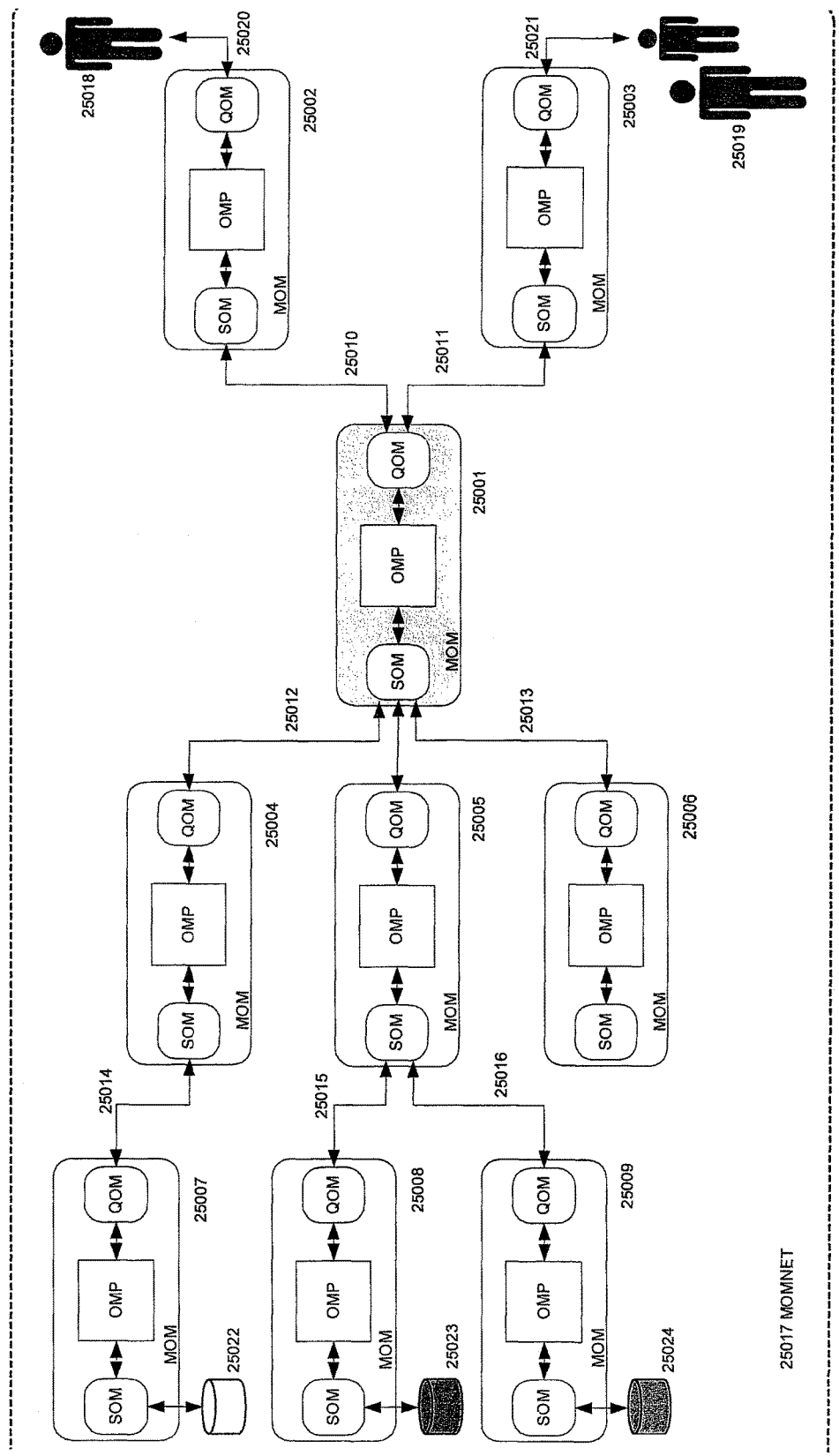
FIG. 25 illustrates the structure of a multimedia object miner network (MOMNET)

A MOSNET with interconnected MOS 72 may provide the environment to enable the emergence of a distributed multimedia agent network using the proposed MOM 11 as fundamental logic building blocks. FIG. 25 depicts an example of the logical structure of a multimedia miner network (MOMNET) 25017 that emerges from the underlying multimedia object store network (MOSNET). A first MOM 25001 receives queries from a second MOM 25002 and a third MOM 25003. To obtain query results, the OMP 22 of the first MOM 25001 searches its associated search object map (SOM), which typically connects with a fourth, fifth and sixth MOM 25004, 25005, 25006, which may further link to a plurality of other MOMs. In the present example, the fifth MOM 25005 links to an eighth MOM 25008, and a ninth MOM 25009 while the fourth MOM 25004 links to a seventh MOM 25007.

The first MOM 25001 also has upstream second and third MOMs 25002, 25003 which are dependent on the first MOM 25001 to fill in certain portion of their associated SOMs. Thus, the logically connected MOMs form a multimedia object miner network (MOMNET) 25017, which can dynamically grown, adjust, shrink, and terminate. Multiple MOMNETs may co-exist and evolve on the MOSNET to provide services to other multimedia application agents. The evolution of the MOMNETs can also be governed by certain operational measures which determine the overall objectives of the network. With properly set operational measures for the network, the MOMs and MOMNETs can compete for resources in the underlying MOSNET (e.g., the internet, or the corporate storage area networks) and follow a "survival of the fittest" rule as the evolution process in nature to optimize the objectives for the network to satisfy human's needs.

Applications

Many potential applications of the structures and methods are provided by the present invention. The following examples are illustrated in detail to demonstrate some of the aspects of the present invention and are not intended to limit the scope of the current invention.

ILLUSTRATIVE EXAMPLE 1

Image Data Base

Figure 22:
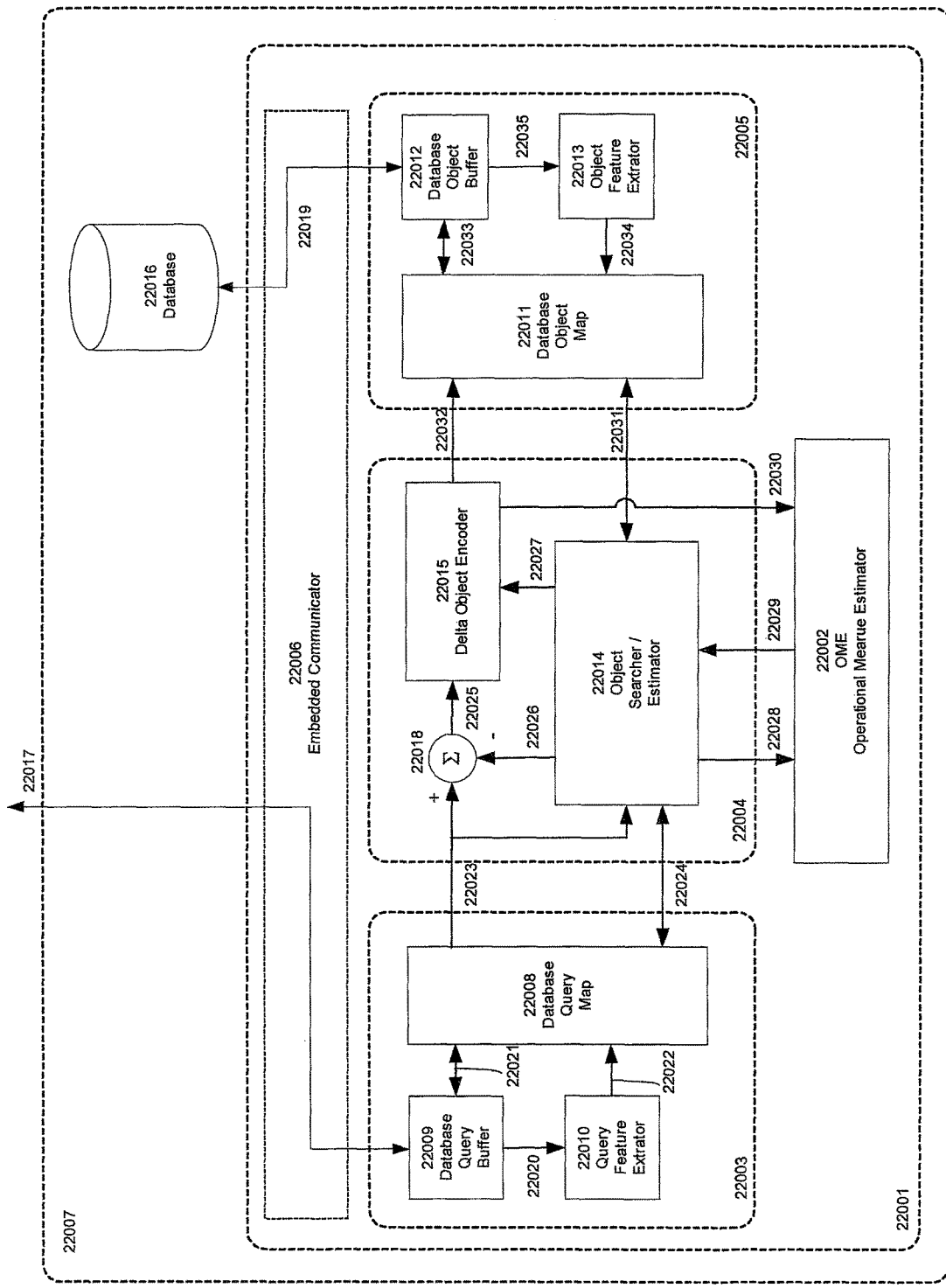
FIG. 22 shows the structure of an n-dimensional image data base storage and retrieving system.

FIG. 22 shows an embodiment of this invention in an n-dimensional image data base applications (e.g., 2-D pictures, 3-D CT images in medical images, etc.). This embodiment also illustrates the application of some of the structures and methods taught in the present invention.

An image write query is typically presented through query bus 22017 to the query object mapper 22003. A database query buffer 22009 converts the image query into object form and a feature vector of the image query is extracted through query feature extractor 22010. The query objects are typically organized on the database query map 22008 according to the feature vector extracted. The input object may be sent through input object bus 22023 to the image database processor 22004 and an object searcher/estimator 22014 typically searches the database object map 22011 to find the closest (measured by relative operational entropy between objects defined earlier) object 22026 derived from the image database 22016, and this object is used to estimate the input query object.

While the object searcher/estimator 22014 performs the search, relative entropy (in terms of the number of bits) may be estimated through an operational measure estimator 22002, that typically receives certain extracted parameters 22028, which may become available during the search, and provides the relative entropy estimation 22029. 22002 can adjust its accuracy through feedback from the actual bit number results 22030 from the delta object encoder 22015. A difference 22025 between an input object 22023 and estimated object 22026, together with a reference index 22027 of the estimated object on a database object map 22011, are encoded through delta object encoder 22015. The encoded data 22032 may then be transmitted through the database object mapper 22005 to the image database 22016.

For an image search query, a query image is typically presented to the system through a communication link 22017 and the image is converted into object form. An object searcher/estimator 22014 may then search through the database object map 22011 to retrieve the encoded image data 22019 (in the encoded format) from the image database 22016. The encoded image is decoded and recovered into the object form through database object buffer 22012. The image object may then be sent through an image object bus 22031 to the object searcher/estimator 22014 to evaluate the query target based on certain search target measures estimated by the OME 22002. The image object with the best operational measure value may be then transmitted to the query object mapper 22003 through 22024, and then presented to the users through a database query bus 22017

A good search performance may be achieved when certain hierarchical structures are included in topological maps 22011 and 22008. An exemplary embodiment is presented in FIG. 23, wherein:

Each image is first partitioned into small image building blocks that may include variable sizes or shapes. The image building blocks may be organized into a bottom level topological map 23003;

In a relatively simple implementation, a n-dimensional image may be partitioned into fixed size n-dimensional blocks and a low level topological map is organized as a regular n-dimensional lattice map. In this instance, a fixed indexing method is used to derive the block index on the low level map based on a n-dimensional voxel (volume element, the n-dimensional extension of pixel in 2-D pictures) location of the first voxel in the block. For example, to partition an n-dimensional image into blocks of volume scale $\{d(i), d(2), \ldots, d(n)\}$, with $d(i)$ the size on the i'th dimension and the lattice index of a block with first voxel at location $\{z(1), z(2), \ldots, z(n)\}$ in the n-dimensional image can be calculated as:

$$B=\{b(1),b(2),\ldots,b(n)\}=\{z(1)/d(1), z(2)/d(2), \ldots, z(n)/d(n)\};\quad [E5]$$

where B is the index on the n-dimensional lattice

Figure 23:
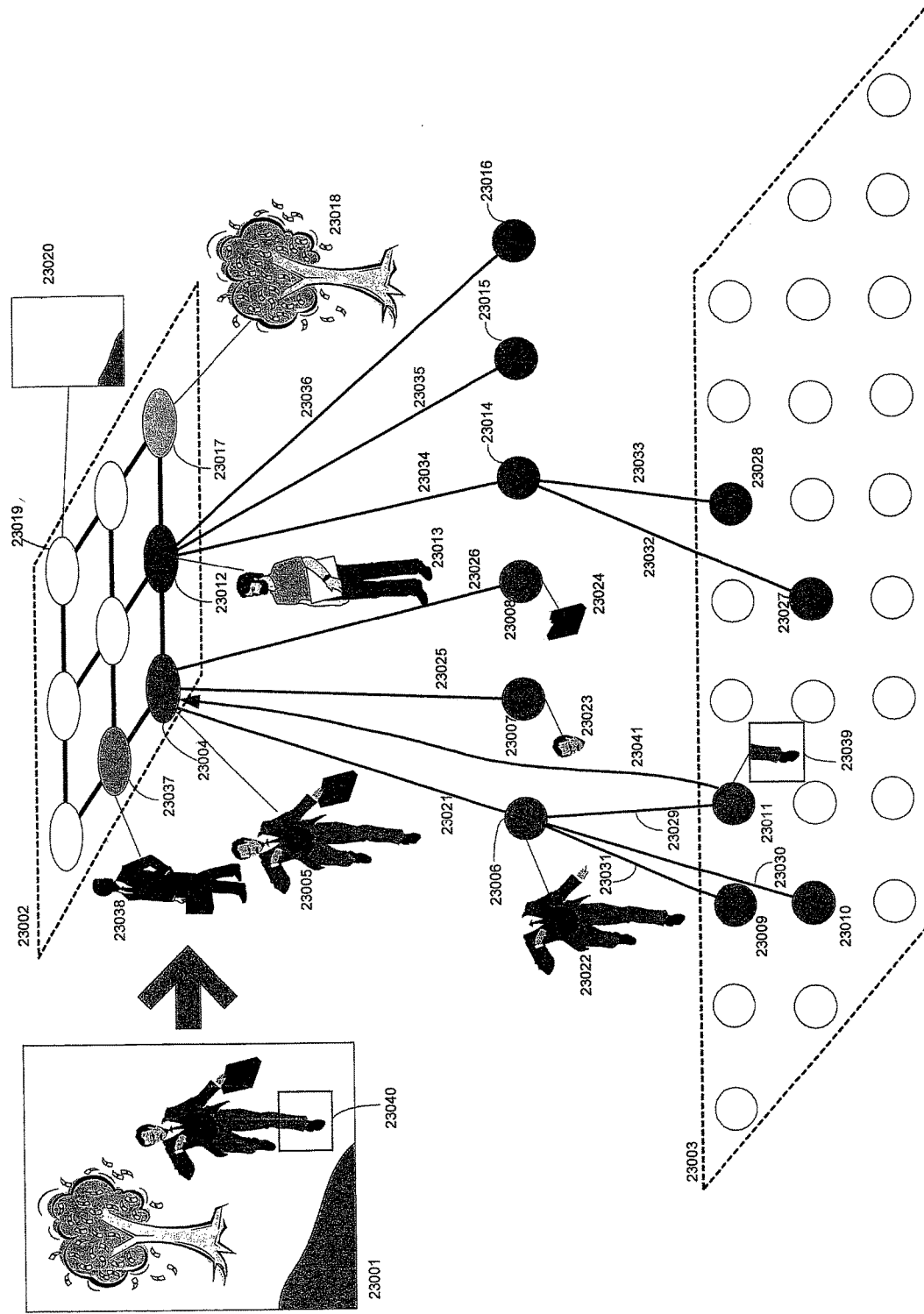
FIG. 23 illustrates the process of content based retrieving through topological maps on an image database system.

The fixed indexing formula may be used for input query images. For practical purposes, the dimensionality of this lattice may be reduced to facilitate processing using current sequential processors. In this latter case, this lattice may be further mapped into a lower dimensional lattice, most likely a 1-D lattice under the limitation of the popular hardware available today. It will be appreciated that, in this dimension reduction process, the topological relationship between adjacent nodes should be preserved to the greatest extent possible. FIG. 14 shows a mapping from 2-D into 1-D lattice. The mapping shown in FIG. 14 can be viewed as taking the 2-D lattice indexes as the feature vector;

On top of this "raw input lattice", other topological maps may be built such that the maps are organized according to the feature vectors extracted from the image blocks;

The blocks may be grouped together into objects through certain object extraction process. As shown in FIG. 23, nodes 23009, 23010, 23011 are three bottom level blocks, which are part of the object 23022. The three blocks are typically grouped together into node 23006, (thus representing the body of a running man 23002);

The object structure may be hierarchical, i.e., an object can contain smaller objects, with the bottom level objects the image building blocks. For example, in FIG. 23, the node 23006 (representing object 23022), node 23007 (representing object 23023), and node 23008 (representing object 23024) are grouped together to form the top level node 23004 (representing the object running man 23021);

The top level objects are typically organized by a lattice topological maps. For example, in FIG. 23, the top level map 23002 sorts out the objects topologically based on their similarity. Node 23004 (representing object 23005), node 23012 (representing object 23013), and node 23037 (representing object 23038) are neighboring nodes on 23002, because they represent objects with similar features (different type of men);

Each node on the lattice topological map are typically hierarchically organized into a tree structure;

A hyper-link could be provided between any node (i.e., a graph topological structure) in the hierarchical map to provide a "worm hole" for "hyperspace" jump during the search process;

Objects may be matched by partial information using this structure. E.g., Node 23011 represents an image block 23039. When the image block 23040 of the input image 23001 is presented to the image data base, the root node 23004 representing the running man object 23005 can be retrieved from the data base through the hyper-link 23041, when the matching of the image block 23040 in the input query object is found in the map 23003. In this way, the search may be conducted relatively quickly and can potentially retrieve the complete information by matching the partial information (in a manner very similar to human neural network associative recall process);

Fast search process:
  methods described above and shown in FIG. 18 may preserve previous query search results on the query object mapper to pick up the best starting point for the search;
  the map can be searched from the starting point with detail and global search process as described earlier in this document.

The following describes an embodiment of a method for object storing and retrieving from a data base using some of the concepts described above. In one approach, the method for storing and retrieving objects in a database can comprise the steps of, first, extracting from an input object a first plurality of parameters, which can, for example, be a desired set of characteristics or a search objective, then, exploring at least some of the objects already stored in the database, and deriving from each database object a second plurality of parameters, and calculating from those database object parameters a set of characteristics corresponding to the search objective, followed by identifying those objects in the database which have the greatest correlation or other correspondence with the desired set of characteristics, where the correlation can be based on a variety of operational measures. For example, for an input object, the operational differential entropy measures the number of bits to encode the input object based on the objects identified from the data base, where the encoding is performed through certain actual encoding operation process. The operational differential entropy measure quantifies the information difference between two objects through certain encoding methods (i.e., the operation). Another example is in searching the design objects from a data base of existing design objects to create new designs requested by certain design request query. Here the operational measure can measure the actual amount of effort to complete the design for the design request query based on the existing design objects identified from the design data base. In this case, the actual amount of design work has to be estimated during the search process. However, after the design objects are identified and the requested design work done, the actual amount of work can be measured (through the operational measure), then feedback to the operational measure estimator to improve the estimation accuracy.

The plurality of parameters in the foregoing example can include, for example, feature vectors of the input objects or data base objects, which may be characterized in one or more dimensions. In addition, the operational measures can include quantifying the differences in information content between objects, such as differential entropy.

In at least some embodiments, the proximate relationship between objects can be measured in one or more dimensions, of which one dimension can be time-related, such as a location in a time-sequence of images or similar time-based media objects.

In some arrangements of the invention, including at least some of those using feature vectors, the database may be mapped to a lattice structure having a plurality of nodes, wherein the step of storing an object includes deriving or otherwise obtaining a set or sets of parameters for each of the one or more other objects, and then extracting neighborhood relationships between the input object and one or more other objects. The neighborhood relationship in such embodiments typically is related to the correspondence between the input object and one or more other objects. In such an arrangement, the step of mapping the input object can also include modifying the lattice structure, which can include node generation and/or node annihilation or deletion. The modifications may be based on factors including utilization and performance, and may also include the operational quality of the system adapted to maintain the lattice structure.

In some arrangements, mapping of the input object can include training of the feature vectors, including training at the parameter level. The step of mapping can alternatively include using interpolation to identify a position for the input object with in the lattice structure, and then mapping the input object to that position. The step of extracting neighborhood relationships can also include processing a plurality of feature vectors using an adaptable or dynamic function which may be parameter-based, or parameterized.

In some embodiments, it may be desirable for one or more of the feature vectors to reside in a higher dimensional space than the lattice structure. In such an arrangement, the neighborhood relationships can exist between pairs of nodes on the lattice structure, and the pairs of nodes can share boundary surfaces or points on Voronoi regions. The shared boundary surfaces or points can, in at least some embodiments, be determined based on the feature vectors. In addition, it can be desirable in some embodiments to map the higher-dimensioned space of the feature vectors to the lattice structure. In at least some embodiment, the higher-dimensioned space can include characteristics for preserving neighborhood relationships between objects.

It will be apparent to those skilled in the art that one dimension on the lattice can represent a time axis, at least in some embodiments.

The process of storing objects can, in some embodiments, predicting a storage location for an input object based on the other objects already stored in the database. The predicted storage location can be associated with a predicted object, wherein the predicted object provides a minimum differential entropy measure related to the input object. One or more difference objects can then be generated, representing differences between the input object and the other objects, followed by storing the one difference objects with one or more difference paths. Each of the one or more difference paths can locate the input object relative to at least one of the other objects.

The process of retrieving can include, in at least some arrangements, selecting a map location of an object to be retrieved, and then fetching information associated with that object to be retrieved. The information can include, for example, difference objects and difference paths related to other objects. The, the other objects can be retrieved, followed by constructing the object to be retrieved from the other objects and the fetched information.

In some arrangements, successive input objects can be mapped onto a query object map, where the query object map preserves the neighborhood mapping of a query object space. In some such arrangements, the query object map is a one dimensional sequence for ordering input objects.

The parameters noted above in the example may also include components extracted using a coefficient de-correlating transform. Such components may include a plurality of signals, each signal having an energy. The plurality of signal energies can include a first signal energy having no alternating component. Each of the other signal energies can be associated with a different band of non-zero frequencies. In some arrangements, the non-zero frequencies are typically lower than a selected first frequency.

ILLUSTRATIVE EXAMPLE 2

Data Security

Figure 24:
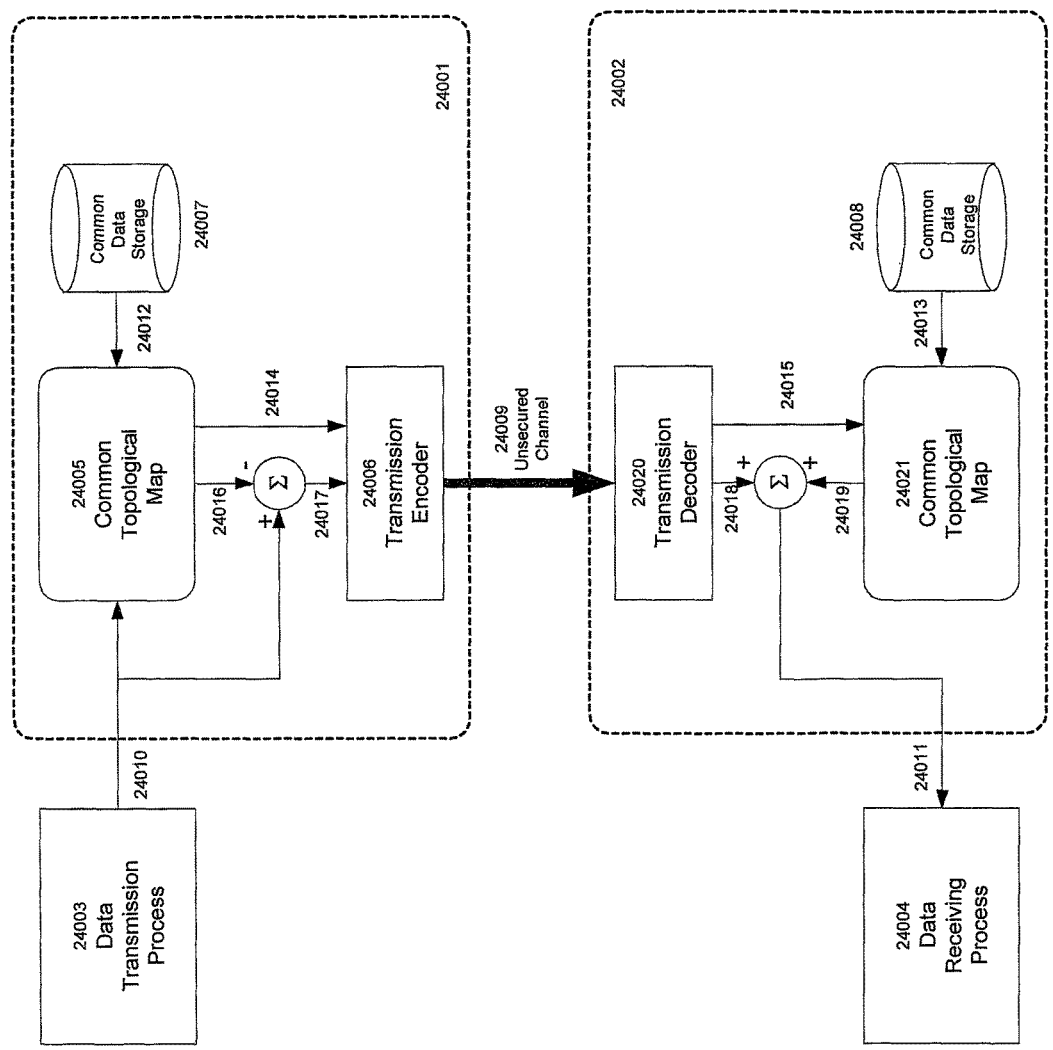
FIG. 24 shows the structure of a data security system based on a storage topological map.

Referring now to FIG. 24, an exemplary embodiment is depicted in which a common data storage and a topological map provide data security. In this example, a data transmitter 24003 transmits data through an unsecured channel 24009 to a data receiver process 24004. The data transmitter 24003 and data receiver 24004 may include a combination of computing devices and software processes. In embodiments of the invention, the transmitter and the receiver include similarly configured data storage that have topological maps of a generally consistent organization. Consequently, data may be securely transmitted by implementing a "delta transmission process" as described immediately hereafter.

On the transmission side, transmission data 24010 is provided to enable retrieval of closest matching reference data 24016 obtained from a common data storage 24007. A calculated difference (delta difference) 24017 between the transmission data 24010 and the matching reference data 24016, together with a map reference index 24014, are encoded by a transmission encoder 24006 and transmitted through an unsecured channel 24009 to the receiving side.

On the receiving side, a transmission decoder 24020 decodes received data into a decoded delta difference 24018 and a decoded map reference index 24015. The map reference index 24015 may then be used to retrieve a receiver-side matching reference data 24019 from a receiver side common data storage 24008. Retrieval is facilitated by commonalities between topological maps on receiver and transmitter sides. The receiver-side matching reference data 24019 is added to the decoded delta difference 24018 to provide a received data 24011. The received data 24011 may then be sent to the receiving process 24004.

ILLUSTRATIVE EXAMPLE 3

Media Contents Push and Pull Agents

An exemplary embodiment is presented in FIG. 25 that may be used to implement media content push and pull agents. A MOMNET 25017 includes a plurality of MOMs that may be used as push and pull agents for media content on a public MOSNET such as the Internet.

In push applications, a first MOM 25001 pushes queries and results to multimedia content consumers. This mode of operation may be characterized as an up-stream linking process from the QOM 24 (see FIG. 2) into the up-stream users or agents.

In the exemplary embodiment, of FIG. 25, the first MOM 25001 may be a media content service agent that can push media content to up-stream MOMs 25002, and 25003, which are personal agents for user 25018 and user group 25019 respectively. In this type of push application, queries and associated data may be delivered to the users before the queries are presented. The associated information may include query results, typically subject to user acceptance of certain some consumer value proposition acceptance. The provision of responses to queries before the queries are presented is possible because previously asked queries are maintained on the QOM 24. Thus, in many embodiments, the first MOM 25001 may identify users and anticipate likely queries. Identification of users is typically made by the personal agents 25002, 25003 and anticipation of queries is typically based on similar queries maintained in neighborhood sets on the QOM 24. Thus, the present invention provides for targeted marketing and customer demand estimation for delivering targeted services.

To deliver media content to a consumer, MOM 25001 pulls multimedia objects from its down stream agents linked through its SOM 23 (see FIG. 2). Media objects may be pulled by a distributed and hierarchical process. In the exemplary embodiment, the first MOM 25001 pulls objects from other MOMs 25004, 25005, 25006. Further, one of the other MOMs 25005 may then pull objects from still other MOMs 25008, 25009 through links 25015, 25016. In one example, one of the still other MOMs 25008 may retrieve the demanded objects from its associated media content database 25023, and a second of the still other MOMs 25009 pulls the demanded objects from its media content database 25024. The retrieved media content then propagates upstream to media content service agent 25001, where both results are integrated for deliver to upstream agents 25002, 25003, representing user 25018 and user group 25019, respectively.

OTHER EXAMPLES

As mentioned above, the structures and methods taught in this document can be applied to a wide range of multimedia applications through varying the object types and operational measures. Some additional examples embodiments are briefly summarized in the followings:

A. Object Oriented Internet Mapping Crawlers:
For a target object application with specific operation measures, a group of mapping crawlers can be dispatched into the Internet to navigate through the Internet hyperspace to generate the topological map for the target object search space. It will be appreciated that the crawlers may be distributed and hierarchical in form to cover the internet through "divide and conquer" and "parallel distributed processing". The basic structure of a crawler is the same as the MOM structure as shown in FIG. 2.

B. Target Personal Multimedia Search Agent on Demand:
Providing target multimedia search agent for specific applications on demand, such that:
 each search agent may be equipped with a search object map (SOM) for a target application space, and
 once the each search agent starts to serve a particular user or other search agent, it may gradually build a QOM 24 (see FIG. 2) that is tailored to the specific demands of users. Otherwise stated, each agent can learn to adapt to the users' needs. Every agent is unique and will evolve to address the different "personality" of the users.

C. Multimedia Data Warehouse Mining:
To map, search, analyze a large multimedia data warehouse for knowledge discovery and decision making.

D. Multimedia Data Base Indexer:
 search through the multimedia data base to build up the indexing system for fast content-based retrieving.
 build MPEG7 based video data bases.

E. Delta Data Compression:
 Current multimedia objects (e.g. image, video, audio, etc.) generally contain a lot of internal redundancy, since they are usually produced by physically processes highly correlated spatially and temporally,
 The redundancy can be eliminated if
  feature patterns within the contents of the objects can be identified
  the correlated contents are represented by the feature patterns only the delta difference
 This method can be applied to one object (like video, image) or to a reservoir of objects (like a image data base)
 If this method is applied to an image data base, the relationships between contents of the images are analyzed through the topological mapping and search process taught above, then only the pattern features and delta are encoded for all the contents in the image database. This was shown in the illustrative example 1 above.

F. Data Encryption, Security, and Error-resilient/fault-tolerant Communications:

If data is represented through the delta data compression method described above with the reference indexes referring to an certain map structure, then data transmission can be very secured, since if only both sides have the compete map, it becomes very difficult to decode the transmitted differential information without prior knowledge of the complete map structure.

Data transmitted in this manner may also be fault tolerant, since the missing portion could be inferred from the context of the topological map on the receiving side. Missing data may result from noise that is typically random and uncorrelated. However, because nodes on the described maps are correlated, the maps can be used to derive missing parts and reject transmission errors.

G. Human Interface Mining:

The QOM 24 (see FIG. 2) may be used to capture and organize the interactions with human users. Interactions may include visual interfaces, voice interfaces, text interfaces, and other human oriented interfaces.

A visual interaction process to guide the visual search process for human users may include:

Certain visual information is typically presented to a user as a starting point, where the visual information is retrieved or synthesized from maps in a MOM and wherein the visual information is typically based on query results of neighboring nodes on the QOM 24;

an interface that permits a user to indicate through simple qualitative answers the features of a presented image for directing a search on the map and enables the MOM to navigate through the topological map with the guidance of the user; and operational measures modeled from human understandable, answerable results and useable for guiding a search process.

Using this approach, a personal MOM agent can "map" the human brain during a certain interaction period with a human user. This personalized agents may bridge the limitations of human interface to provide a link to the MOSNET that may offer the ultimate service to its human master.

This type of agent are embodied intelligence agents which "embody" and feed on information received from physical interactions with human users.

This type of agent may have the ability to perform mining operations not only on the MOSNET, but also on a human brain to pursue the human beings' furthest potential.

H. Personal Interactive Multimedia Object on-Demand Activities:

Based on the MOMNET/MOSNET structure shown in FIGS. 8 and 25, media objects may be searched, delivered, processed, and integrated for presentation to consumers to enable many interactive multimedia media activities. Such activities include:

Personal KTV, movie production, and virtual studio;
Karaoke on demand;
Multiple player video game on demand
Virtual get together party for friends family on MOSNET Although the present invention has been particularly described with reference to embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A method for mapping a multidimensional object on a topological map, comprising the steps of:
   locating a closest other object mapped on the topological map, the closest other object having a predetermined correspondence with a first object; and
   mapping the first object on the topological map in relative proximity to the other object;
   wherein correspondence between objects is related to a difference measure associated with the objects; and
   wherein the topological map is a multidimensional lattice, and wherein the step of locating includes:
   extracting multidimensional feature vectors from objects; and
   mapping the objects onto a lower-dimensional lattice according to difference measures of the multidimensional feature vectors.

2. The method of claim 1, wherein the step of mapping includes preserving neighborhood relationships between objects.

3. The method of claim 1, wherein at least one of the dimensions of the map is time-related.

4. The method of claim 1, wherein the n-dimensional lattice is adjusted through a SPAN algorithm.

5. The method of claim 1, wherein the map is hierarchical, and further comprising the steps of:
   obtaining one or more feature vectors of the input object;
   locating a subset on the hierarchical map, the subset including objects having a predetermined correspondence with an input object; and
   mapping the object within the subset;
   wherein the hierarchical map includes a plurality of nodes.

6. The method of claim 5, wherein correspondence between objects is measured as an operational difference measure between the objects.

7. The method of claim 6, wherein the predetermined correspondence is a threshold difference measure, and wherein the step of locating includes:
   comparing a plurality of target objects to obtain relationships between the input object and each of the plurality of target objects; and
   assigning to the subset, objects with the predetermined correspondence.

8. The method of claim 6, wherein the operational difference is measured as an operational differential entropy, wherein operational differential entropy quantifies difference in information contents between objects.

9. The method of claim 5, wherein the nodes include topological maps.

* * * * *